US009953404B2

(12) United States Patent
Humphrey

(10) Patent No.: US 9,953,404 B2
(45) Date of Patent: *Apr. 24, 2018

(54) SYSTEMS AND METHODS FOR SETTING INITIAL DISPLAY SETTINGS

(71) Applicant: LI-COR, Inc., Lincoln, NE (US)

(72) Inventor: Patrick G. Humphrey, Lincoln, NE (US)

(73) Assignee: LI-COR, Inc., Lincoln, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/973,328

(22) Filed: Dec. 17, 2015

(65) Prior Publication Data
US 2016/0104271 A1   Apr. 14, 2016

Related U.S. Application Data

(63) Continuation of application No. 14/444,425, filed on Jul. 28, 2014, now Pat. No. 9,218,652.
(Continued)

(51) Int. Cl.
*G06T 5/00* (2006.01)
*G09G 5/10* (2006.01)
*G06T 5/40* (2006.01)

(52) U.S. Cl.
CPC ............. *G06T 5/008* (2013.01); *G06T 5/007* (2013.01); *G06T 5/40* (2013.01); *G09G 5/10* (2013.01); *G06T 2207/20024* (2013.01); *G06T 2207/20028* (2013.01); *G06T 2207/20182* (2013.01); *G06T 2207/20208* (2013.01); *G09G 2320/029* (2013.01); *G09G 2320/066* (2013.01); *G09G 2320/08* (2013.01)

(58) Field of Classification Search
CPC ... G06T 5/00; G06T 5/40; G06F 17/18; G06F 17/30699
See application file for complete search history.

(56) References Cited

U.S. PATENT DOCUMENTS 6,198,845 B1   3/2001   Tse et al.
6,353,674 B1   3/2002   Dewaele
(Continued)

FOREIGN PATENT DOCUMENTS

WO   WO 98/37738 A1    8/1998
WO   WO 2010/123428 A1  10/2010
WO   WO 2013/124312 A1  8/2013

OTHER PUBLICATIONS

International Search Report and Written Opinion for PCT/US2014/048505 preformed in the European Patent Office dated Oct. 6, 2014.
(Continued)

*Primary Examiner* — Antonio A Caschera
(74) *Attorney, Agent, or Firm* — Leydig, Voit & Mayer, LLP; Gerald T. Gray

(57) ABSTRACT

A method for applying a filter to data to improve data quality and/or reduce file size. In one example, a region of interest of an image is identified. A histogram is generated of pixel intensity values in the region of interest. The histogram is iteratively updated to focus (zoom) in on the highest peak in the histogram. A Gaussian curve is fitted to the updated histogram. A bilateral filter is applied to the images, where parameters of the bilateral filter are based on the parameters of the Gaussian curve.

21 Claims, 20 Drawing Sheets

Related U.S. Application Data

(60) Provisional application No. 61/859,110, filed on Jul. 26, 2013.

(56) References Cited

U.S. PATENT DOCUMENTS

| | | | |
|---|---|---|---|
| 7,010,163 B1 | 3/2006 | Weiss | |
| 7,283,652 B2 | 10/2007 | Mendonca et al. | |
| 7,343,193 B2 | 3/2008 | Block et al. | |
| 7,555,161 B2 | 6/2009 | Haddon et al. | |
| 7,920,741 B2 | 4/2011 | Miller et al. | |
| 8,073,236 B2 | 12/2011 | Peng et al. | |
| 8,081,836 B2 | 12/2011 | Porikli | |
| 8,139,888 B2 | 3/2012 | Porikli | |
| 8,150,202 B2 | 4/2012 | Mohanty et al. | |
| 8,224,109 B2 | 7/2012 | Bosco et al. | |
| 8,238,687 B1 | 8/2012 | Lim et al. | |
| 8,254,717 B2 | 8/2012 | Velthoven et al. | |
| 8,515,131 B2 | 8/2013 | Koch et al. | |
| 8,594,445 B2 | 11/2013 | Cox | |
| 8,660,352 B2 | 2/2014 | Gish | |
| 8,761,539 B2 | 6/2014 | Kerofsky et al. | |
| 9,218,652 B2 * | 12/2015 | Humphrey | G06T 5/007 |
| 2002/0054694 A1 | 5/2002 | Vachtsevanos et al. | |
| 2007/0248265 A1 | 10/2007 | Lundstrom et al. | |
| 2009/0129671 A1 | 5/2009 | Hu et al. | |
| 2010/0104168 A1 | 4/2010 | Dobbe | |
| 2012/0099779 A1 | 4/2012 | Gupta et al. | |
| 2013/0257887 A1 | 10/2013 | Xu et al. | |

OTHER PUBLICATIONS

Jenson, John R., "Introductory Digital Image Processing ($3^{rd}$ Edition)(Chapter 8)"; *Introductory Digital Image Processing*; May 10, 2004, Prentice Hall, XP055143676 (pp. 266-285).

Ji-Young, Lee et al., "Single-Molecule Detection of Surface-Hybridized Human Papilloma Virus DNA for Quantitative Clinical Screening", *Analytical Chemistry*, vol. 79, No. 21, Nov. 1, 2007; XP055028370 (pp. 8083-8089).

Buyue, Zhang et al., "Adaptive Bilateral Filter for Sharpness Enhancement and Noise Removal", *IEEE Transactions on Image Processing*, IEEE Service Center, Piscataway, NJ, US; vol. 15, No. 5, May 1, 2008; pp. 664-678.

De Silva et al., "A Depth Map Post-Processing Technique for 3D-TV Systems based on Compression Artifact Analysis"; *IEEE Journal of Selected Topics in Signal Processing*; Jan. 1, 2011.

Marcele, A.C. Vieiera et al."Filtering of Poisson Noise in Digital Mammography Using Local Statistics and Adaptive Wiener Filter", *Breast Imaging*, Springer Berlin Heidelberg, Berlin; Jul. 8, 2012; pp. 268-275.

Pace, T. et al, "A Multiresolution Approach to Image Enhancement Via Histogram Shaping and Adaptive Wiener Filtering"; *Visual Information Processing XVII*; SPIE vol. 6978; May 12, 2008.

Theerawit, Wiliaprasitporn et al., "Ultrasound b-scans image denoising via expectation maximization-based unsharp masking", *10th International Conference on Electrical Engineering/Electronics, computer, Telecommunications and Information Technology (ECTI-CON)*; IEEE. May 15, 2013; pp. 1-6.

* cited by examiner

Auto Gaussian Fit (AGF)

Image Segment Quality Factors

Quality Ratio #1: Histogram Intensity Match Ratio $$Q1 = 1 - \frac{\sum_{i=1}^{n}|Delta_i|}{\sum_{i=1}^{n}GaussFit_i}$$

$Delta_i = HistCounts_i - GaussFit_i$ $n = number\ of\ bins$

Q1 Range (0 – 1): 0 = no match, 1 = perfect match

FIG. 12A

Image Segment Quality Factors

Quality Ratio #2: Histogram Frequency Match Ratio $$Q2 = \frac{\sum_{i=1}^{n-1}|Deriv_i|}{2 * \sum_{i=1}^{n}|Delta_i|}$$

$Delta_i = HistCounts_i - GaussFit_i$ $Deriv_i = Delta_i - Delta_{i+1}$ $n = number\ of\ bins$ Q1 Range (0 – 1): 0 = no match, 1 = perfect match

FIG. 12B

SYSTEMS AND METHODS FOR SETTING INITIAL DISPLAY SETTINGS

CROSS-REFERENCE TO RELATED APPLICATIONS

This patent application is a continuation of, and claims the benefit of, U.S. patent application Ser. No. 14/444,425, filed on Jul. 28, 2014, now U.S. Pat. No. 9,218,652, which claims the benefit of U.S. Provisional Patent Application No. 61/859,110, filed Jul. 26, 2013, which is incorporated by reference. This application cross-references to U.S. patent application Ser. No. 14/444,392, titled "Adaptive Noise Filter", filed concurrently herewith, which claims the benefit of U.S. Provisional Patent Application No. 61/859,106, filed Jul. 26, 2013, the contents of which are each hereby incorporated by reference.

BACKGROUND

The present disclosure relates to the field of computing, and in particular to methods and apparatus for analyzing and/or filtering any data stream of trace data or image data that is characterized by Gaussian noise and setting display settings of a display device for displaying the data stream. Examples of data streams include data streams with data representing still images, video, and other one-dimensional, two-dimensional, three-dimensional, four-dimensional, and higher-dimensional data sets.

Most display devices have a limited display range. For example, a display device may be an 8-bit display that allows images to be displayed having an intensity range of 0 to 255. Setting display settings of the display device includes setting a display range for the display device. One conventional approach to setting the display range includes identifying the minimum (MIN) and maximum (MAX) intensity values and scaling the range of the MIN and MAX to fit within the dynamic range of the display device.

However, the conventional approach to setting the display range suffers from certain drawbacks. For a data set that has a very strong signal (relative to the noise), then it is possible that just the strong signal is visible so that weaker signals and/or noise are not visible or barely visible. For a data set that has no signal or weak signals (relative to the noise), then the fine grain of the noise would be exaggerated, resulting in a low quality image.

Accordingly, there remains a need in the art for a technique for setting the display settings of a display device that overcomes the drawbacks and limitations of conventional approaches.

SUMMARY

Embodiments of the disclosure provide techniques for setting or adjusting the display settings of a display device configured to display an image of a data set that includes a Gaussian noise distribution. In one embodiment, a technique is provided that identifies a mean and standard deviation of the noise component of the signal. A display range for a display image is determined based on the calculated mean and standard deviation of the noise component of the signal and a configurable multiplier. The image is displayed on the display device based on the display range.

One embodiment provides a method for setting display settings of a display device. The method includes: receiving a data stream, e.g., with data representing an image to be displayed; determining a mean ($\mu$) of a system background component of the data stream; determining a standard deviation ($\sigma$) of a system background component of the data stream; identifying or receiving a multiplier value (M); calculating a display range of the image to be displayed based on the mean, the standard deviation, and the multiplier value; and setting the display settings of the display device based on the display range. The method also typically includes outputting or displaying data representing the image data. The method steps are typically implemented in or by one or more processors.

Some embodiments provide a method for setting display settings of a display device, wherein the method typically includes receiving a data stream, determining a mean ($\mu$) of a system background component of the data stream, determining a standard deviation ($\sigma$) of a system background component of the data stream, identifying or receiving a multiplier value (M), and calculating a display range of an image based on the mean, the standard deviation, and the multiplier value. The method also typically includes setting the display settings of the display device based on the display range. The method steps are typically implemented in or by one or more processors.

In certain aspects, the multiplier value is preconfigured. In certain aspects, the multiplier value is approximately 100. In certain aspects, the multiplier value is adjustable.

In certain aspects, calculating a display range comprises calculating: $\mu+(M*\sigma)$. In certain aspects, the method includes filtering the data stream prior to determining the mean and prior to determining the standard deviation. In certain aspects, filtering the data stream comprises selecting a region of interest, generating an initial histogram of pixel intensity values in the region of interest, wherein the histogram includes N bins, identifying a first bin as a bin having a greatest count of pixel intensity values, identifying a left bin as a closest bin to the left of the first bin in the histogram that has a count that is less than a first count percentage of the greatest count, identifying a right bin as a closest bin to the right of the first bin in the histogram that has a count that is less than a second count percentage of the greatest count, generating an updated histogram of pixel intensity values having a range between the identified left bin and identified right bin, fitting a Gaussian curve onto the updated histogram, and applying a filter to the image based on parameters of the Gaussian curve.

In certain aspects, the first count percentage and the second count percentage are 2%. In certain aspects, the filter is a bilateral filter. In certain aspects, edges of the updated histogram are within a threshold percentage of the range of the pixel intensity values between the identified left bin and identified right bin. In certain aspects, the threshold percentage is 80%.

Some embodiments provide a computer readable medium storing code, which when executed by one or more processors cause the one or more processors to implement a method of setting display settings of a display device. The code typically includes instructions to receive a data stream with data representing an image to be displayed, to filter the data stream; and thereafter to determine a mean ($\mu$) of a system background component of the data stream, to determine a standard deviation ($\sigma$) of a system background component of the data stream, to identify or receive a multiplier value (M), and to calculate a display range of the image to be displayed based on the mean, the standard deviation, and the multiplier value. The code also typically includes instructions to set the display settings of the display device based on the display range.

Some embodiments provide image display system, comprising a display device, and a processor coupled with the display device. The processor is typically configured (e.g., based on executing one or more instructions) to receive a data stream with data representing an image to be displayed, to filter the data stream; and thereafter to determine a mean (μ) of a system background component of the data stream, to determine a standard deviation (σ) of a system background component of the data stream, to identify or receive a multiplier value (M), and to calculate a display range of the image to be displayed based on the mean, the standard deviation, and the multiplier value. The processor is also typically configured to set one or more display settings of the display device based on the display range. The display system is useful for displaying, inter alia, still images and/or video images or frames. In certain aspects, the system includes a memory that stores instructions that are executable by the processor to implement the steps performed by the processor.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIGS. 12A-12C illustrate factors for determining a representative region, according to one embodiment.

DETAILED DESCRIPTION

Embodiments of the disclosure provide techniques for setting the display settings of a display device configured to display an image of a data set that includes a Gaussian noise distribution. In one embodiment, a technique is provided that identifies a mean and standard deviation of the noise component of the signal. A display range for a display image is determined based on the calculated mean and standard deviation of the noise component of the signal and a configurable multiplier. The image is displayed or rendered on the display device based on the display range.

In some embodiments, the data set can be filtered with an adaptive and appropriately tuned bilateral filter before calculating the mean and standard deviation of noise component of the signal. Filtering the data in this manner decreases the standard deviation of the noise and, therefore, may lower the determined display range, which provides for a higher quality image. In some embodiments, the bilateral filter reduces noise in the image while preserving edges. The bilateral filter includes a set of parameters that is based on the data in the image. In some implementations, the set of parameters can vary (in some cases widely) from image to image. Techniques are presented herein to determine the appropriate set of parameters to use when applying the bilateral filter. These techniques provide the ability to enhance image data having a high dynamic range. These techniques also provide the ability to reduce the file size (e.g., improve compression) of an image or images.

According to various embodiments, a technique for determining an optimal set of parameters for the bilateral filter is automatic and does not require manual user input or configuration. For example, the technique does not require a priori statistical data estimates, ranges or limits but rather, independently determines underlying data characteristics on a de novo basis.

Figure 1A:
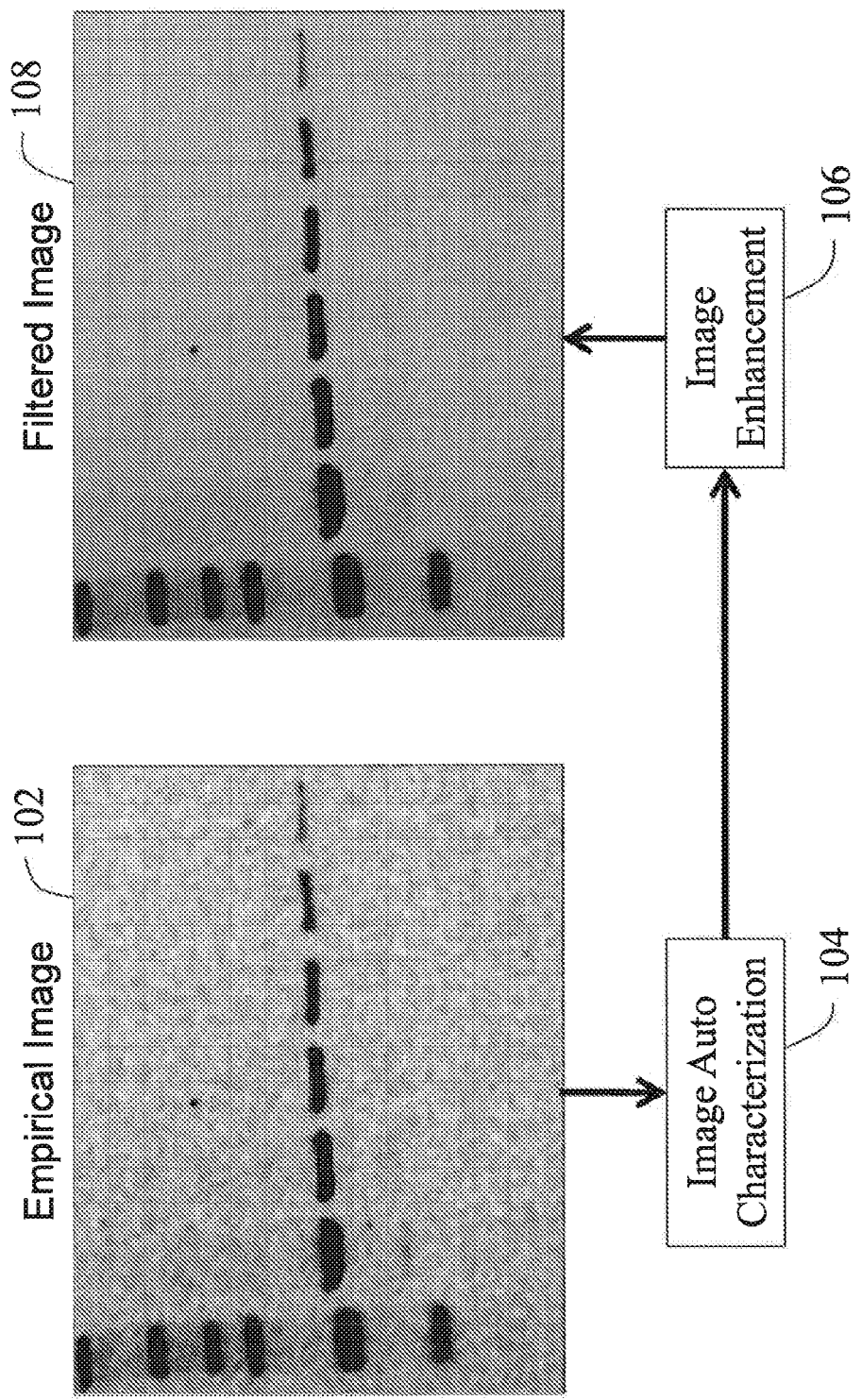
FIG. 1A is a block diagram of an example system for enhancing an image, according to an example embodiment.

FIG. 1A is a block diagram of an example system for enhancing an image, according to an example embodiment. As shown, an input image 102 is received. The input image 102 can be captured via any technically feasible imaging device. The input image 102 typically includes data representing a plurality of viewable pixels, the number of which is typically defined by the resolution of the image capture device or input device used. In one example, the input image 102 depicts a biological assay, e.g., a western blot membrane. In other examples, the input image 102 may depict any image or information.

Data representing the input image 102 is received by an image characterization engine 104. As described in greater detail herein, the image characterization engine 104 analyzes the input image 102 (e.g., analyzes the data representing the image) to identify an optimal set of filter parameters to use when applying a filter to the input image 102. The set of filter parameters is transmitted to an image enhancement engine 106 that applies a filter to the input image 102 based on the set of filter parameters to achieve an output image 108. In one embodiment, the filter is a bilateral filter. In other embodiments, other filters can be applied to the input image 102. According to various embodiments, each of the image characterization engine 104 and/or the image enhancement engine 106 can be implemented in hardware, software, and/or a combination of hardware and software.

Figure 1B:
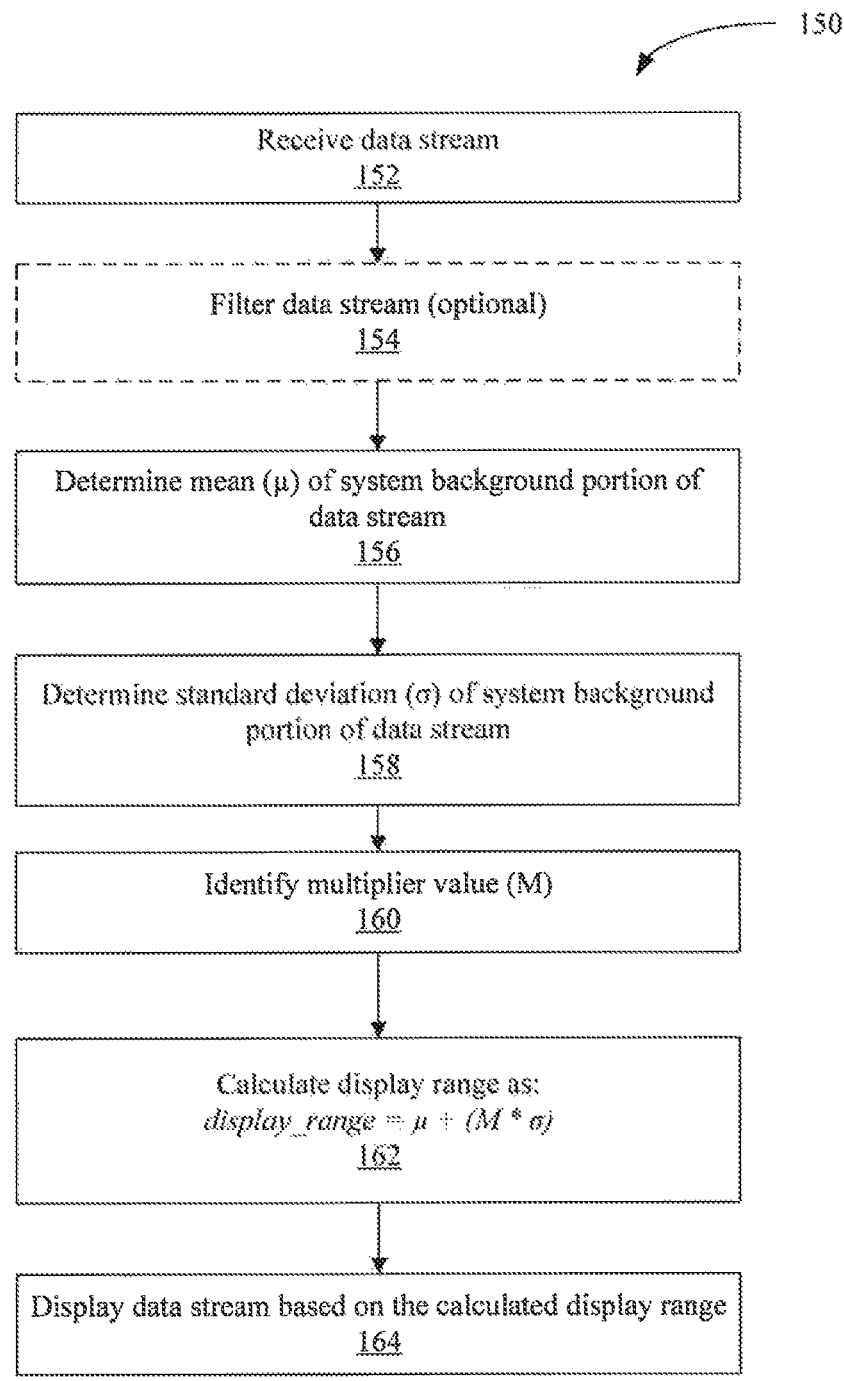
FIG. 1B is a flow diagram for setting the display settings of a display device based on noise of a data stream, according to one embodiment.

FIG. 1B is a flow diagram for setting the display settings of a display device based on noise of a data stream, according to one embodiment. As shown, the method 150 begins at step 152, where an analytics engine, such as the image characterization engine 104 in FIG. 1A, receives a data stream. The data stream may be organized as a histogram of pixel intensity values divided into N bins, as described in greater detail herein.

At step 154, the analytics engine optionally filters the data stream using an appropriately tuned and adaptive bilateral filter. One embodiment for performing step 154 is described in FIG. 2. Step 154 is optional and may be omitted.

At step 156, the analytics engine determines a mean ($\mu$) of a system background component of the data stream. One embodiment for determining the mean of the system background component is described in FIGS. 10-11.

At step 158, the analytics engine determines a standard deviation ($\sigma$) of a system background component of the data stream. One embodiment for determining the standard deviation of the system background component is described in FIGS. 10-11.

At step 160, the analytics engine identifies a multiplier value (M). In one embodiment, the multiplier value M is preconfigured as a constant value. For example, the multiplier value M may be determined empirically as a certain multiple of a number of standard deviations that provides visually pleasing results when displaying images on a particular display device. In one example, the multiplier value M may be approximately 100.0. In some embodiments, the multiplier value M is configurable or adjustable by a user.

At step 162, the analytics engine calculates a display range to use when displaying the data stream. In one embodiment, the display range is calculated using the equation:

$$\text{display\_range} = \mu + (M^*\sigma)$$

where $\mu$ is the mean of the system background component of the data stream, $\sigma$ is the standard deviation of the system background component of the data stream, and M is the multiplier value. Calculating the display range using the above equation may provide better results for displaying the data, as compared to the conventional technique of determining the display range as a percentage of the range of the MIN and MAX intensity values.

At step 164, the analytics engine displays the data stream with the calculated display range. The user can adjust the display range as needed for the user's specific purpose. However, calculating the display range in the above manner is intended to provide a good initial setting of the display range, compared to prior approaches. In some embodiments, when using the above method, the system background appears similar across different data streams that have widely varying intensity values.

In some embodiments having multiple frames, the display range is calculated for each frame. In other embodiments having multiple frames, the display range is fixed across some or all frames.

As described above, at step 154, the analytics engine optionally filters the data stream using an appropriately tuned and adaptive bilateral filter. If optional step 154 is performed, and the data is filtered, the calculated standard deviation of the system background component would likely be smaller than if the data is not filtered. This would, therefore, result in a smaller calculated display range at step 162. Having a smaller display range may provide more visually pleasing results as compared to the result if the data were not filtered.

Figure 14A:
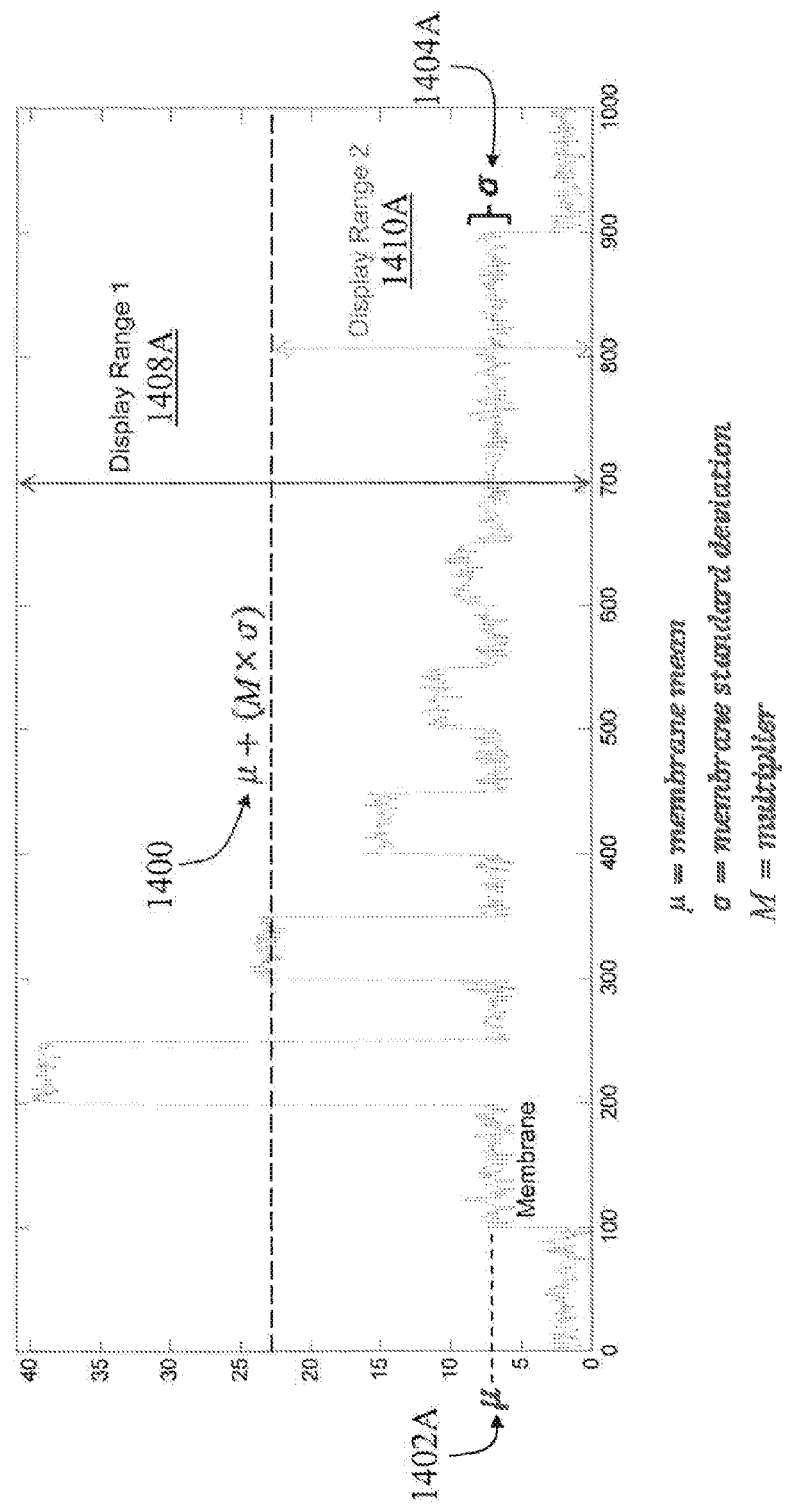
FIG. 14A is a conceptual diagram illustrating a data stream having signal components and a system background component, according to one embodiment.

FIG. 14A is a conceptual diagram illustrating a data stream having signal components and a system background component, according to one embodiment. As shown, the membrane mean $\mu$ (1402A) of the system background component is represented in FIG. 14A. Also shown is the standard deviation $\sigma$ (1404A) of the system background component. The unmodified display range 1408A of the data stream is shown in FIG. 14A as "Display Range 1." As described above, a calculated display range 1410A can be calculated using equation 1400: display_range=$\mu+(M^*\sigma)$, where M is a multiplier value. The calculated display range 1410A is shown in FIG. 14A as "Display Range 2." Using a smaller display range, such as the calculated display range 1410A relative to display range 1408A, when displaying the data on the display device may provide for more visually pleasing results.

Figure 14B:
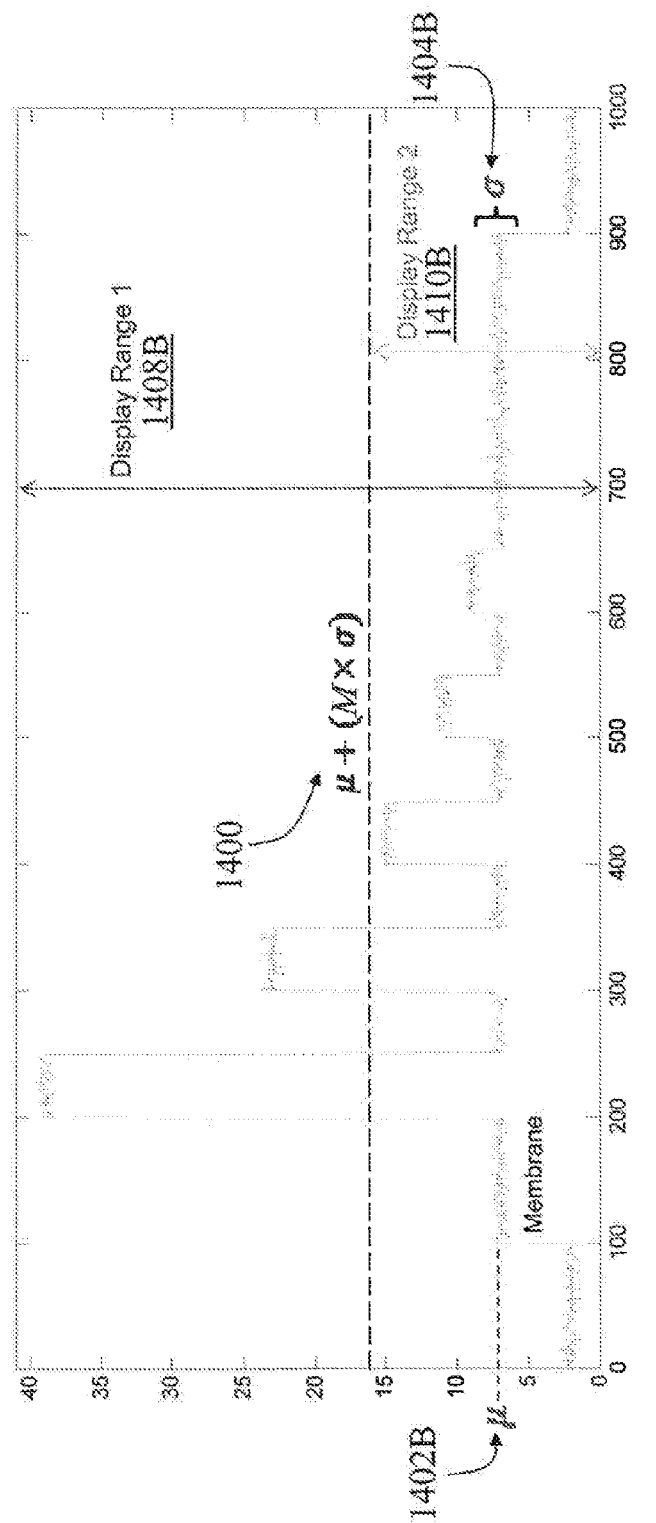
FIG. 14B is a conceptual diagram illustrating a data stream having signal components and a system background component, where the data is filtered before computing the display range, according to one embodiment.

FIG. 14B is a conceptual diagram illustrating a data stream having signal components and a system background component, where the data is filtered before computing the display range, according to one embodiment. In one embodiment, diagram shown in FIG. 14B represents the same data stream as shown in FIG. 14A, where the data has been filtered using an appropriately tuned and adaptive bilateral filter, as described below in FIG. 2. As shown in FIG. 14B, the membrane mean $\mu$ (1402B) of the system background component is represented. Also shown is the standard deviation $\sigma$ (1404B) of the system background component. In one embodiment, standard deviation $\sigma$ (1404B) of the filtered data (as shown in FIG. 14B) is smaller than the standard deviation $\sigma$ (1404A) of the unfiltered data (as shown in FIG. 14A). FIG. 14B also shows the unmodified display range 1408B of the filtered data stream as "Display Range 1." As described above, a calculated display range 1410B can be calculated using equation 1400: display_range=$\mu+(M^*\sigma)$, where M is a multiplier value. The calculated display range 1410B is shown in FIG. 14B as "Display Range 2." Using a smaller display range, such as the calculated display range 1410B relative to display range 1408B, when displaying the data on the display device may provide for more visually pleasing results. In addition, the calculated display range 1410B is smaller than the calculated display range 1410A in FIG. 14A, which may provide even more visually pleasing results. In some cases, the calculated display range 1410B is larger than display range 1408B and provides for more visually pleasing results.

Figure 15B:
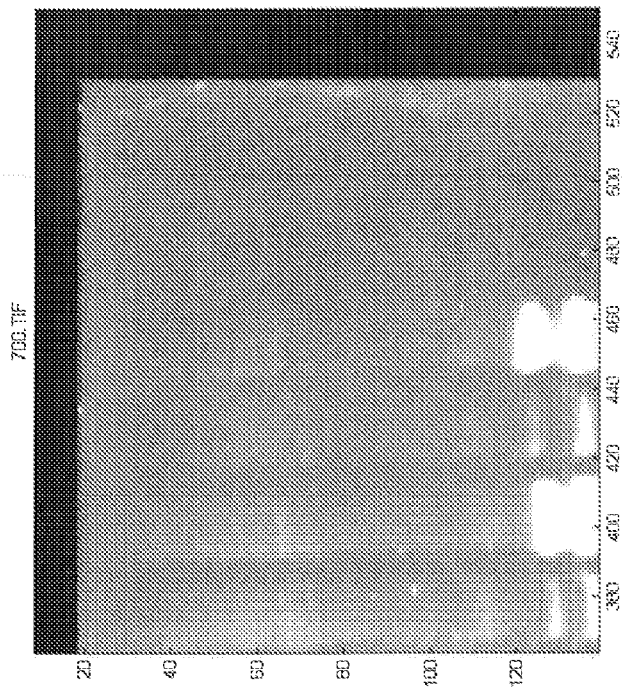
FIGS. 15B and 16B illustrate examples of images displayed with second display settings, according to some embodiments.
Figure 15A:
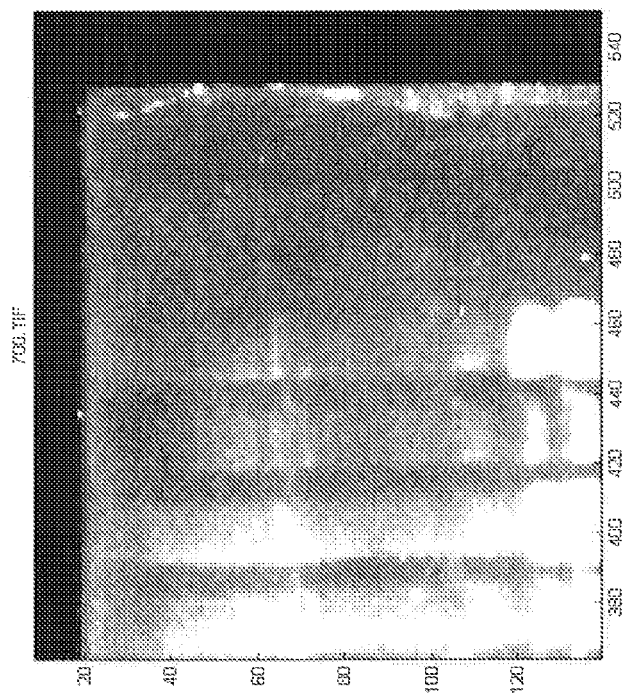
FIGS. 15A and 16A illustrate examples of images displayed with first display settings, according to some embodiments.

FIG. 15A illustrates an example of an image displayed with first display settings, according to one embodiment. As shown, the image in FIG. 15A is relatively grainy. A grainy ratio (i.e., grainy ratio=(MAX−MIN)/std_dev) of the first display settings is approximately 20. FIG. 15B illustrates an example of an image displayed with second display settings, where the second display settings are based on a display range calculated using the method of FIG. 1B, according to one embodiment. As shown, the image in FIG. 15B is much less grainy than the image in FIG. 15A. The grainy ratio of the second display settings is approximately 100.

Figures 16A, 16B:
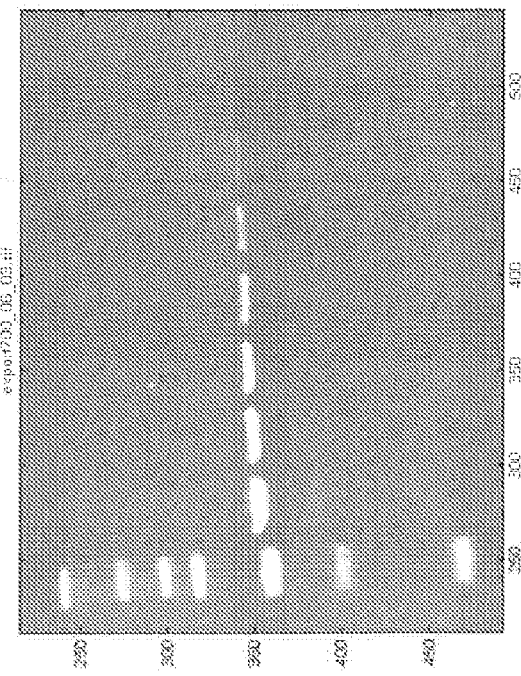

FIG. 16A illustrates an example of an image displayed with first display settings, according to one embodiment. As shown, the image in FIG. 16A is relatively grainy. A grainy ratio (i.e., grainy ratio=(MAX−MIN)/std_dev) of the first display settings is approximately 20. FIG. 16B illustrates an example of an image displayed with second display settings, where the second display settings are based on a display range calculated using the method of FIG. 1B, according to one embodiment. As shown, the image in FIG. 16B is much less grainy than the image in FIG. 16A. The grainy ratio of the second display settings is approximately 100.

As can be seen from comparing FIGS. 15B and 16B, the background portions of the images look fairly similar, even though the two images have very different display ranges. The image in FIG. 15B has only 800 units of display range, whereas the image in FIG. 16B has 20,000 units of display range. As can be seen, using embodiments of the disclosure provided herein to set the display settings provides for visually pleasing and consistent results, even when the images being displayed have a large display range absolute value.

Figure 2:
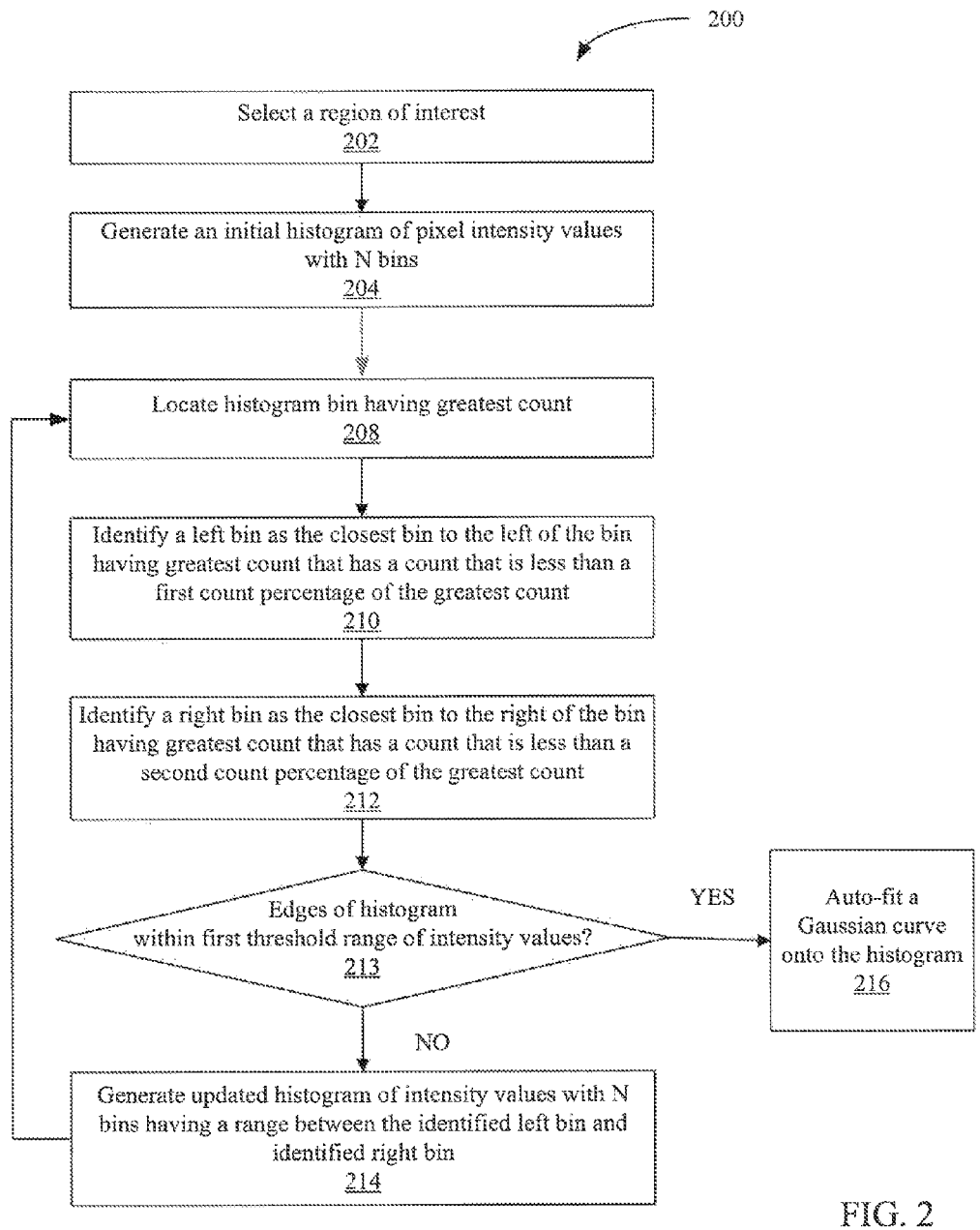
FIG. 2 is a flow diagram for fitting a Gaussian curve to a distribution of pixel intensity values in a region of interest, according to an example embodiment.

FIG. 2 is a flow diagram for fitting a Gaussian curve to a distribution of pixel intensity values in a region of interest, according to an example embodiment. Advantageously the present embodiments do not require a priori selection of a region of interest, but rather, independently determine region(s) from which data characterization can be most accurately extracted, as will be discussed in more detail below. Also, as will be shown in more detail below, data background characteristic extraction is not dependent on selection (automatic or otherwise) of region(s) containing exclusively background (no signal or artifacts).

Figure 3:
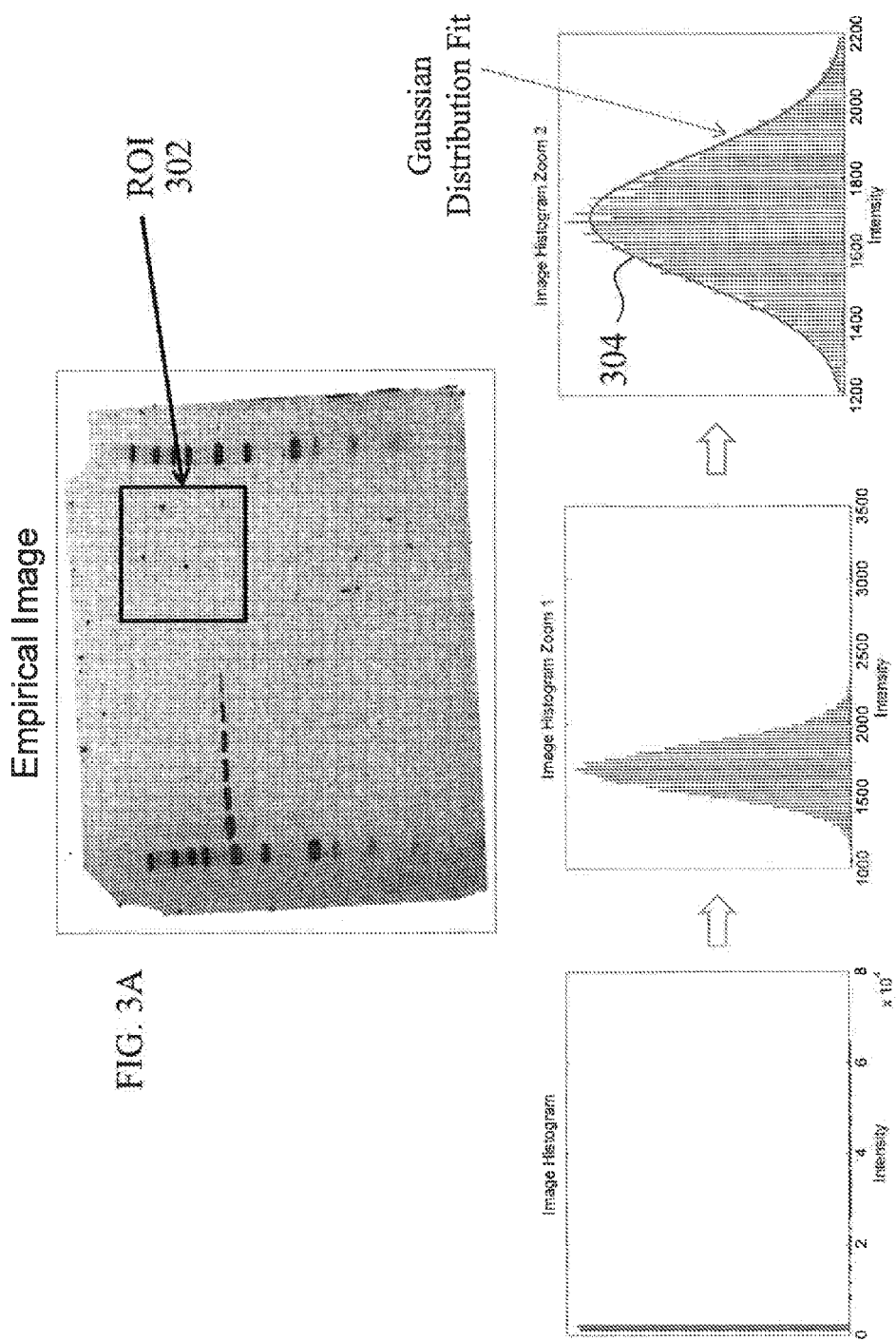
FIG. 3A is a conceptual diagram of an input image and a region of interest, according to an example embodiment.
FIGS. 3B-3D are conceptual diagrams showing a histogram of pixel intensities in a region of interest, according to example embodiments.

As shown, the method 200 begins at step 202, where an analytics engine, such as the image characterization engine 104 in FIG. 1, automatically selects a region of interest of an input image. In some embodiments, the region of interest can be any arbitrary region of an input image. FIG. 3A is a conceptual diagram of an input image and a region of interest (ROI) 302, according to an example embodiment.

In other embodiments, as described below, a grid is super-imposed onto the input image and one or more regions in the grid can serve as the region of interest.

At step 204, the analytics engine generates an initial histogram of pixel intensity values with N bins for the selected region 302. FIG. 3B illustrates an example of an initial histogram for the selected region 302. The value of N can be configurable. In one example, N is 100 bins. The vertical axis of the histogram corresponds to a count of the number of pixels in each intensity bin. The initial range (e.g., min, max) of the bins, e.g., values of the left- and right-most bins, in the initial histogram may be preconfigured, for example, a range of between 0.0 (min) and $8\times10^4$ (max). Typically, the initial range will be the maximum possible range (min to max intensity for the selected region), however, the initial range can be other than the maximum possible range for the selected region. The width of each bin can be automatically determined based on the bin range. As shown in the example in FIG. 3B, most of the pixels have intensity values to the far left side of the initial histogram.

At step 208, the analytics engine locates a histogram bin having the greatest count of pixel intensity values. At step 210, the analytics engine identifies a left bin as the closest bin to the left of the bin having the greatest count that itself has a count that is less than a first count percentage of the greatest count, e.g., a first count percentage less than 2% of the greatest count. The first count percentage value of 2% is merely an example. The first count percentage is configurable and can be any percentage amount. At step 212, the analytics engine identifies a right bin as the closest bin to the right of the bin having the greatest count that itself has a count that is less than a second count percentage of the greatest count, e.g., a second count percentage less than 2% of the greatest count. The second count percentage value of 2% is merely an example. The second count percentage is configurable and can be any percentage amount. In some embodiments, the first and second count percentages are the same. In other embodiments, the first and second count percentages are different.

At step 213, the analytics engine determines whether the edges of the histogram are within a first threshold range of intensity values, e.g., 80% of intensity values for the entire region of interest. The value of 80% is merely an example. This percentage is configurable and can be any percentage amount, e.g., 50%, 60%, etc.

If the analytics engine determines that the edges of the histogram are not within the first threshold range of intensity values for the entire region of interest, then the method 200 proceeds to step 214. As shown in FIG. 3B, the edges of the histogram are not within 80% of the range of intensity values for the entire region of interest.

At step 214, the analytics engine generates an updated histogram of intensity values with N bins having a range between the identified left bin and the identified right bin. In this manner, via steps 208-214, the analytics engine is effectively "zooming in" onto the highest peak in the distribution of pixel intensity values. FIG. 3C shows an example of zooming in onto the distribution shown in the histogram in FIG. 3B.

After the updated histogram is generated at step 214, the method 200 returns to steps 208-213, where the analytics engine determines whether the edges of histogram are within the first threshold, e.g., a threshold percentage of 80% of a range of intensity values for the entire region of interest. If not, then the method 200 continues to repeat the steps 208-214 until the query at step 213 is satisfied. FIG. 3D shows an example of a histogram where the edges of histogram are within 80% of a range of intensity values for the entire region of interest.

If, at step 213, the analytics engine determines that the edges of the histogram are within 80% of the range of intensity values for the entire region of interest, then the method 200 proceeds to step 216. At step 216, the analytics engine fits a Gaussian curve onto the histogram. As shown in FIG. 3D, a Gaussian curve 304 is fit to the data shown in the histogram. Generating the Gaussian curve can be performed using any technically feasible technique, one of which is described below in FIGS. 10-11. The Gaussian curve includes an amplitude, mean, and variance. In one embodiment, the amplitude, mean, and variance of the Gaussian curve correspond to a set of parameters to be used by a bilateral filter to be applied to the input image to improve the image quality.

According to some embodiments, the Gaussian curve that is fit to the data set depends on which region of the input image is selected as the region of interest.

Figure 4:
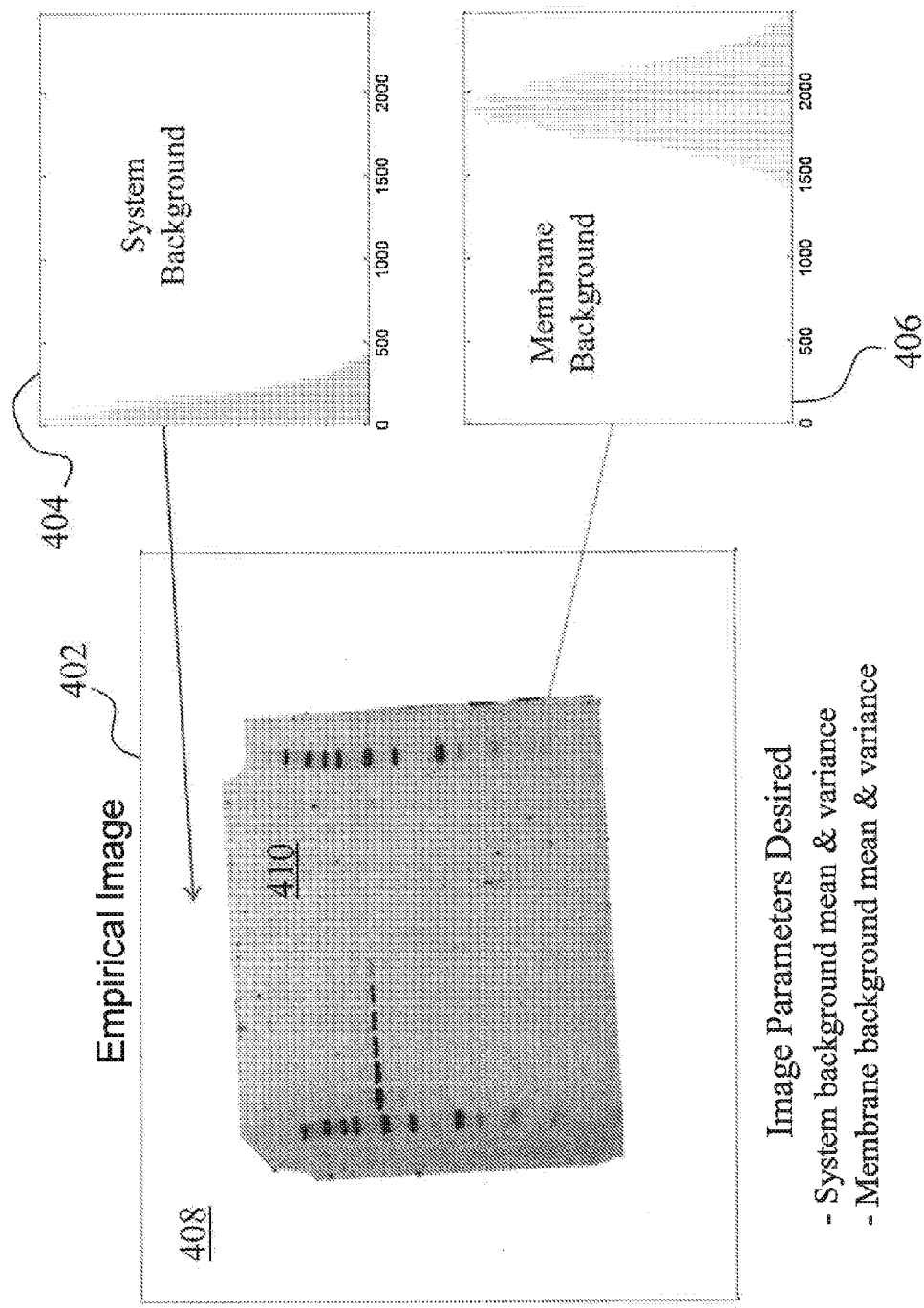
FIG. 4 is a conceptual diagram illustrating an example image showing a membrane placed on a platform, such as a slide, which contributes to a system background, according to an example embodiment.

FIG. 4 is a conceptual diagram illustrating an example image 402 showing a membrane 410 placed on a platform, such as a slide, which contributes to a system background 408, according to an example embodiment. Histogram 404 shows a distribution of pixel intensity values of a region of interest associated with the system background 408. Histogram 406 shows a distribution of pixel intensity values of a region of interest associated with the membrane 410. As shown, the histograms 404, 406 have different distributions. As such, if a Gaussian curve were to be fitted to each of the histograms 404, 406, the parameters of the two Gaussian curves would be different.

Figure 5:
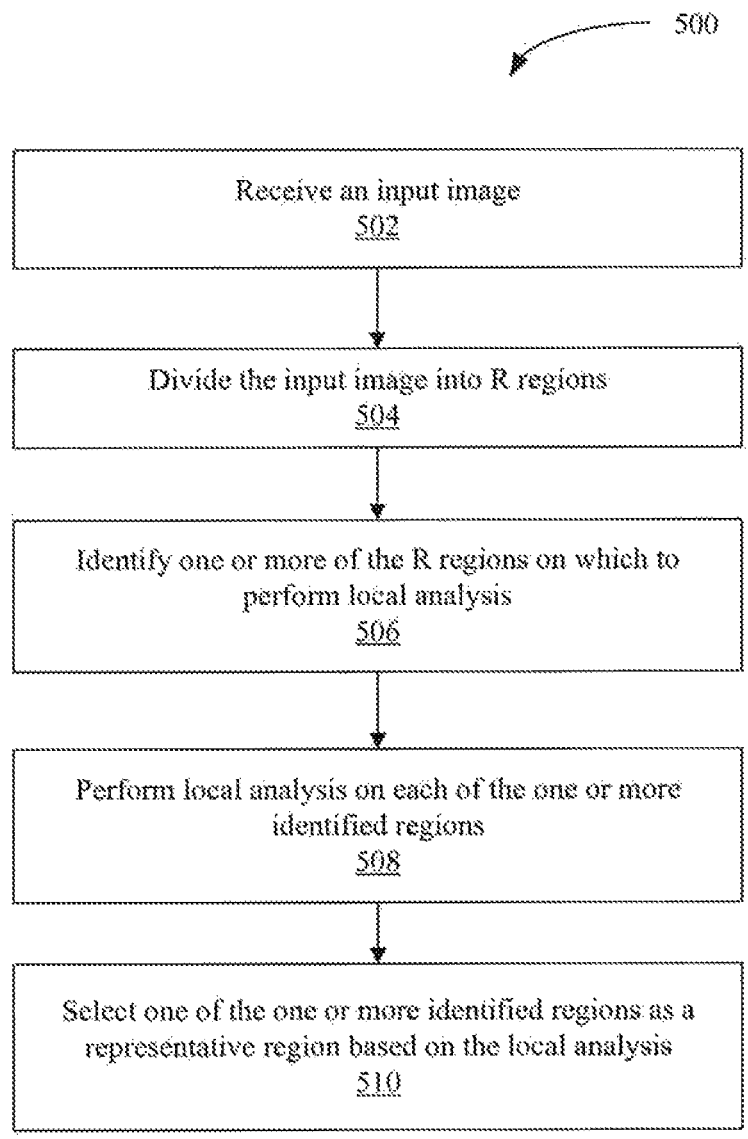
FIG. 5 is a flow diagram for selecting a representative region of interest for an input image, according to an example embodiment.

FIG. 5 is a flow diagram for selecting a representative region of interest for an input image, according to an example embodiment.

Figure 6:
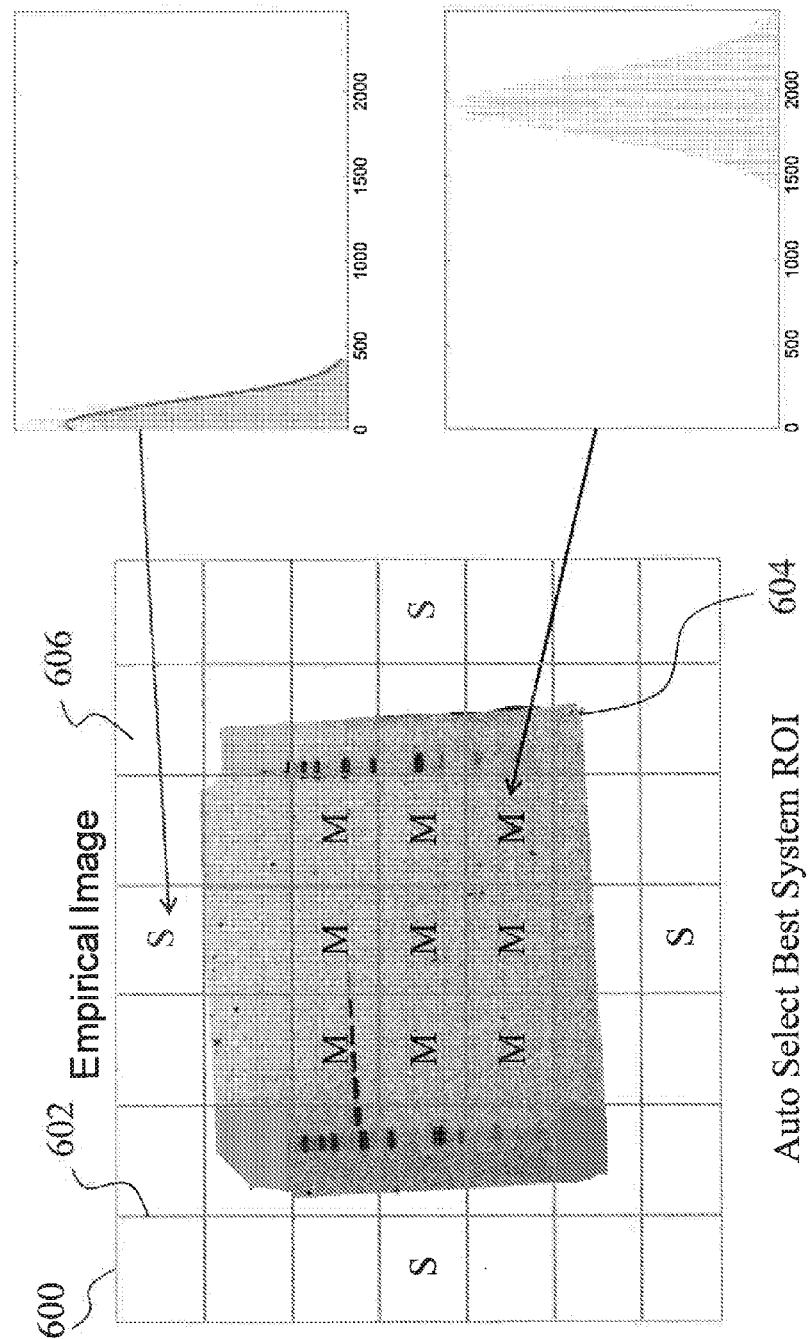
FIG. 6 is a conceptual diagram illustrating an input image and a grid superimposed onto the input image, according to an example embodiment.

As shown, the method 500 begins at step 502, where an analytics engine, such as the image characterization engine 104 in FIG. 1, receives an input image, e.g., data representing an image. At step 504, the analytics engine divides the input image into R regions. FIG. 6 is a conceptual diagram illustrating an input image 600 and a grid 602 superimposed onto the input image 600, according to an example embodiment. In the example shown, the grid 602 is a 7×7 grid, thus R=49.

At step 506, the analytics engine identifies one or more of the R regions on which to perform local analysis. As described, in one example, the input image 600 shows membrane 604 with a system background 606. Certain regions of the input image created as a result of superimposing the grid 602 onto the input image 600 are selected for local analysis. In one implementation, four regions are selected for local analysis as being "system background" regions and nine regions are selected for local analysis as being "membrane" regions. For example, a top-middle, a left-middle, a bottom-middle, and a right-middle region are selected for local analysis as being "system background" regions, and the nine center regions are selected for local analysis as being "membrane" regions. In other embodiments, various techniques for overlaying a grid onto the image may be implemented. For example, an X-by-X grid may be overlaid onto the image. Then, a Y-by-Y grid may also be overlaid on the image, where Y=X−1. As such, multiple grids can be overlaid onto the image to provide for more cells or regions to be analyzed. Overlaying multiple grids, and thus providing more regions, can provide for a higher probability of obtaining better results.

At step 508, the analytics engine performs local analysis on each of the one or more identified regions. The local analysis performed for each region comprises fitting a Gaussian curve to a distribution of pixel intensity values in the region, as described in the method 200 in FIG. 2. At step 510, the analytics engine selects one of the one or more identified regions as a representative region based on the local analysis. In one embodiment, the parameters of a bilateral filter that is applied to the entire image is based on the Gaussian parameters of a Gaussian curve that is fit to a distribution of pixel intensity values of the representative region.

Figure 7:
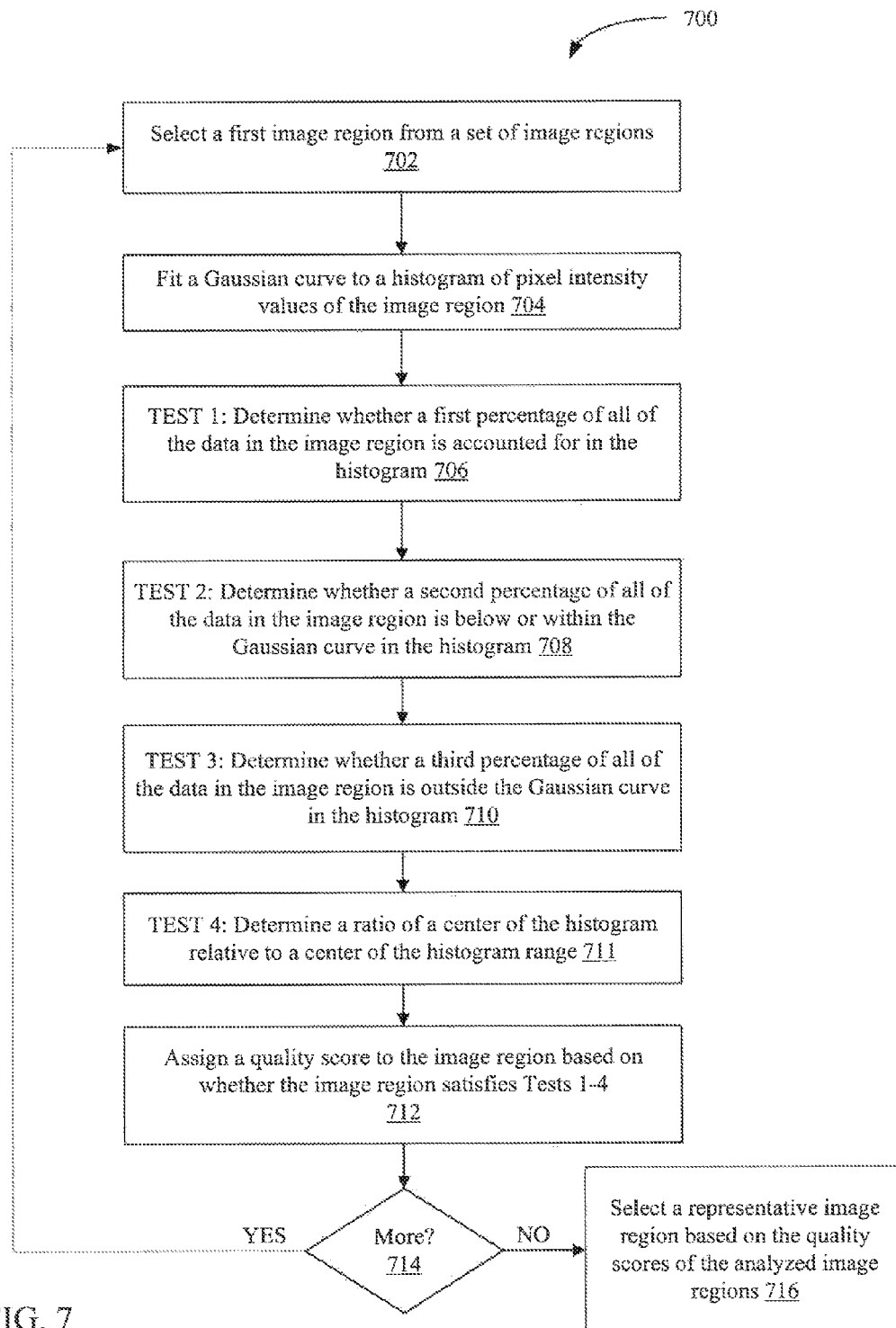
FIG. 7 is a flow diagram of method steps for selecting a representative image region based on local analysis of one or more image regions, according to an example embodiment.

FIG. 7 is a flow diagram of method steps for selecting a representative image region based on local analysis of one or more image regions, according to an example embodiment.

As shown, the method 700 begins at step 702, where an analytics engine, such as the image characterization engine 104 in FIG. 1, selects a first image region from a set of image regions to analyze. As described, in one example, a top-middle, a left-middle, a bottom-middle, and a right-middle region are selected for local analysis as being "system background" regions. In another example, the nine center regions are selected for local analysis as being "membrane" regions. One of these image regions is selected at step 702.

At step 704, the analytics engine fits a Gaussian curve to a histogram of pixel intensity values of the image region. An example implementation for fitting a Gaussian curve to the histogram of pixel intensity values of the image region is described in FIG. 2.

At step 706, the analytics engine determines whether a first percentage of all of the data in the image region is accounted for in the histogram (Test 1). In one example, the value of the first percentage is 60%. This percentage is configurable and can be any percentage amount. As described in FIG. 2, steps 208-214, the method 200 iteratively zooms in onto the highest peak in the histogram. If there is another peak that is remote from the highest peak in the histogram, then the other peak is not accounted for in the Gaussian distribution and curve. If the amount of data outside the range of the histogram is over the first percentage, Test 1 fails for the image region. Otherwise, Test 1 passes for the image region.

At step 708, the analytics engine determines whether a second percentage of all of the data in the image region is below or within the Gaussian curve in the histogram (Test 2). In one example, the value of the second percentage is 40%. This percentage is configurable and can be any percentage amount. If at least the second percentage of the total data in the image region is below or within the Gaussian curve, Test 2 passes for the image region. Otherwise, Test 2 fails for the image region.

At step 710, the analytics engine determines whether a third percentage of all of the data in the image region is outside the Gaussian curve in the histogram (Test 3). In one example, the value of the third percentage is 10%. This percentage is configurable and can be any percentage amount. If more than the third percentage of the total data in the image region is outside the Gaussian curve, Test 3 fails for the image region. Otherwise, Test 3 passes for the image region.

At step 711, the analytics engine determines a ratio of a location of the center of the histogram to a location of the center of the histogram range (Test 4). In one embodiment, the center of the histogram comprises the bin with the greatest count. In one embodiment, Test 4 is referred to as a "peak location test." In some embodiments, better results are achieved when the histogram is centered within the histogram range. In one embodiment, Test 4 is passed if the ratio of a location of the center of the histogram to a location of the center of the histogram range is within a threshold range amount. Test 4 fails if the ratio of a location of the center of the histogram to a location of the center of the histogram range is not within the threshold range amount.

At step 712, the analytics engine assigns a quality score to the image region based on whether the image region satisfies Tests 1-4. In one example, an image region receives a point for each Test 1-4 that is passed.

At step 714, the analytics engine determines whether there are more image regions to analyze. If yes, the method 700 returns to step 702, described above. If not, then the method 700 proceeds to step 716.

At step 716, the analytics engine selects a representative image region based on the quality scores of the analyzed image regions. In one embodiment, the analytics engine selects the image region with the highest score. If multiple regions have the same or similar (e.g., within 1% of each other) high scores, then the analytics engine selects one region as the representative region based on a least squares best fit (i.e., smallest sum of the square of the errors). According to various embodiments, any of Tests 1-4 is optional and can be omitted.

Figure 8A:
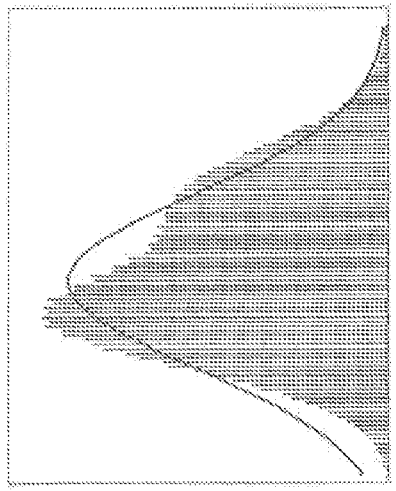
FIGS. 8A-8D are conceptual diagrams illustrating Gaussian curves fit to example histograms of distributions of pixel intensity values in different regions of interest, according to example embodiments.
Figure 8B:
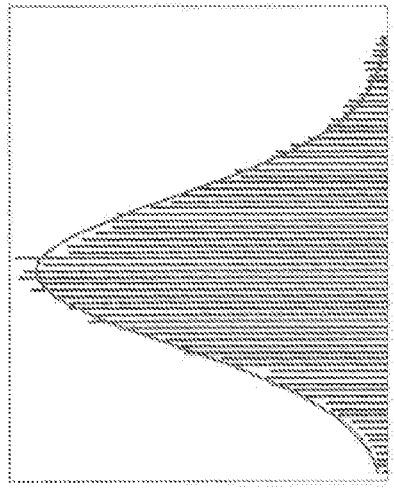
Figure 8C:
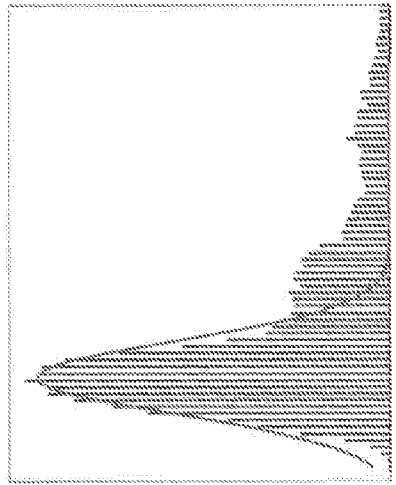
Figure 8D:
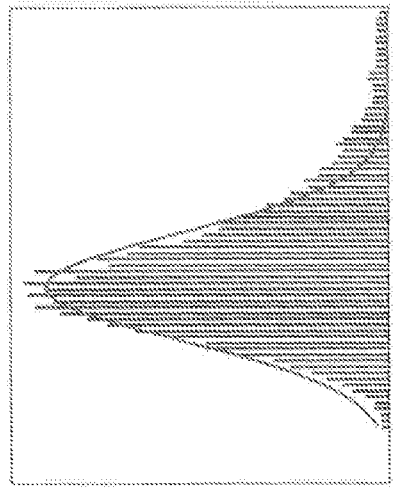

FIGS. 8A-8D are conceptual diagrams illustrating Gaussian curves fit to example histograms of distributions of pixel intensity values in different regions of interest, according to example embodiments. As shown in FIGS. 8A-8C, a certain number of values lie outside the Gaussian curve and/or the Gaussian curves are not centered in the histogram range. These deviations from the Gaussian curve may cause the distributions in FIGS. 8A-8C to fail one or more of Tests 1-4 described in FIG. 7. By contrast, FIG. 8D shows the best distribution of the distributions shown in FIGS. 8A-8D with respect to Tests 1-4, where a majority of the data is below or within the Gaussian curve and the center of the Gaussian curve is near the center of the histogram range.

As shown in FIG. 6, in one embodiment, one or more regions are selected as "system background" regions and a first representative region is selected as a representative system region, and one or more other regions are selected as "membrane" regions and a second representative region is selected as a representative background region. The method 700 described in FIG. 7 can be applied to the set of "system" regions and the set of "membrane" regions separately.

In one embodiment, if there is a membrane region that satisfies each of Tests 1-4, then the parameters of the Gaussian curve representing such a membrane region are used as the filter parameters of the bilateral filter applied to the entire image. If there is no membrane region that satisfies each of Tests 1-4, then a system background region that satisfies each of Tests 1-4 is selected. The parameters of the Gaussian curve representing such a system background region are used as the filter parameters of the bilateral filter applied to the entire image. If there is no membrane region or system background region that satisfies each of Tests 1-4, then a bilateral filter is not applied to the input image.

Figure 12C:
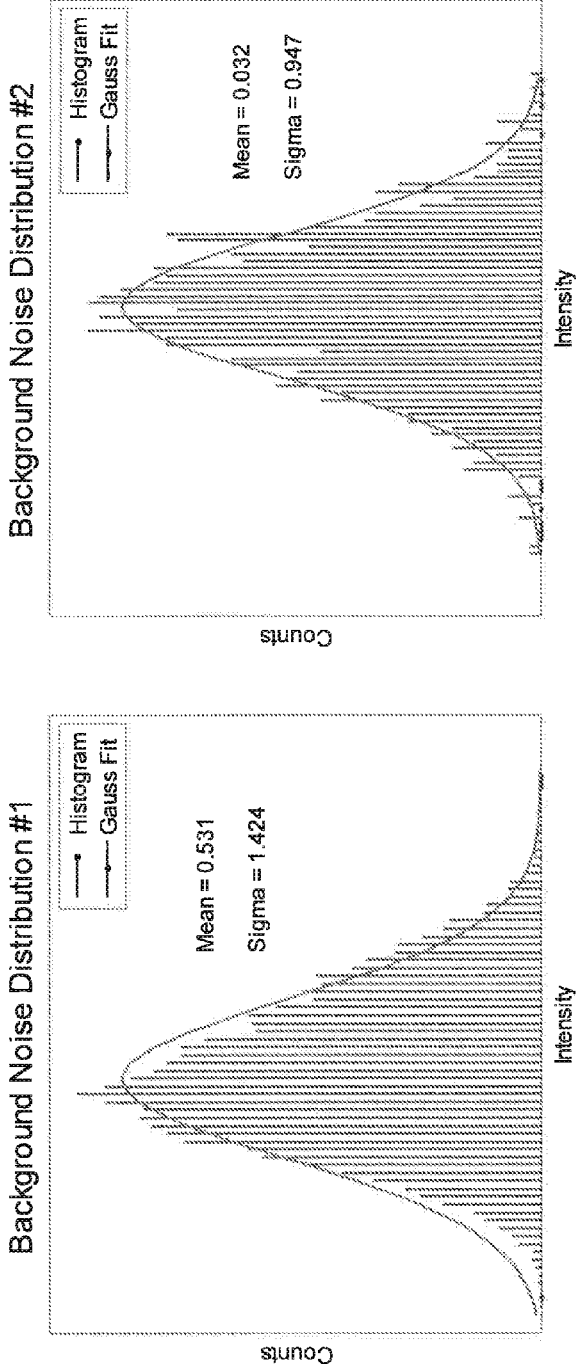

Tests 1-4 in FIG. 7 describe one embodiment for identifying a region with the best fit. In another embodiment, two ratios can be used to determine best fit: an intensity match ratio and a frequency match ratio. These quality ratios are referred to as "Q1" (intensity match ratio) and "Q2" (frequency match ratio) in FIGS. 12A-12C. FIG. 12A provides an equation for calculating an intensity match ratio, according to one embodiment. FIG. 12B provides an equation for calculating a frequency match ratio, according to one embodiment. As shown in FIG. 12C, for two different regions, the Q1 metric for both regions is similar: i.e., Q1=0.8705 for a first region, and Q1=0.8544 for a second region. However, the Q2 values for the two distributions are not similar. For the first sample, Q2=0.2422, whereas for the second region, Q2=0.7200. In one implementation, the second region is selected as the representative region based on having a similar Q1 score, but a better Q2 score.

Figure 13:
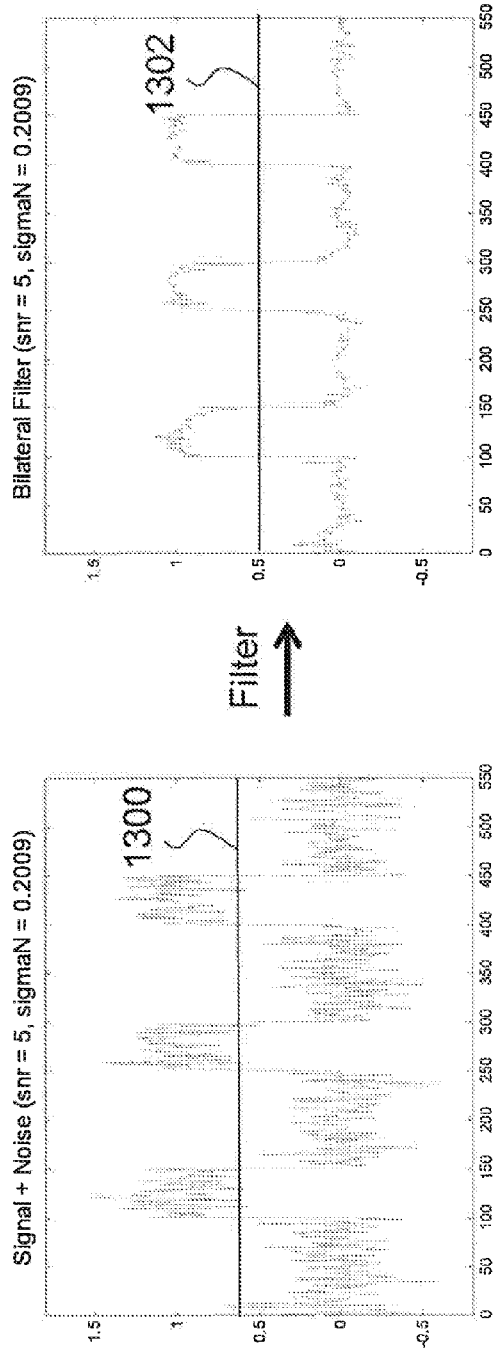
FIG. 13 is a conceptual diagram illustrating applying a bilateral filter to a signal, according to one embodiment.

Although the embodiments of the disclosure described above are directed to applying a bilateral filter to image data, the same technique and approach can be used to filter lower dimensional data sets. For example, the bilateral filter approach described herein can be applied to a trace or signal. FIG. 13 is a conceptual diagram illustrating applying a bilateral filter to a signal, according to one embodiment. As shown in the image on the left, the signal includes a large amount of noise, i.e., has a signal-to-noise ratio of 5. A threshold line 1300 can be applied to the signal to remove noise, such that only those components of signal that are above the line 1300 are maintained. However, setting an appropriate threshold line 1300 in the noisy signal on the left in FIG. 13 is difficult to achieve such that the signal is preserved and noise is eliminated. This is because some of the noise may fall above the threshold line 1300 and some of the signal may fall below the threshold line 1300. If a bilateral filter is applied to the signal, as disclosed herein, then the signal is much cleaner as shown in the image on the right in FIG. 13, i.e., the signal can be easily distinguished from the noise. A threshold line 1302 can be applied to the signal to remove noise, such that only those components of signal that are above the line 1300 are maintained. In the example shown, placing a line at 0.5 removes the noise yet preserves the signal. Placing a line at 0.5 in the image on the left, however, does not achieve good results because some signal is lost and some noise is maintained.

Figure 9:
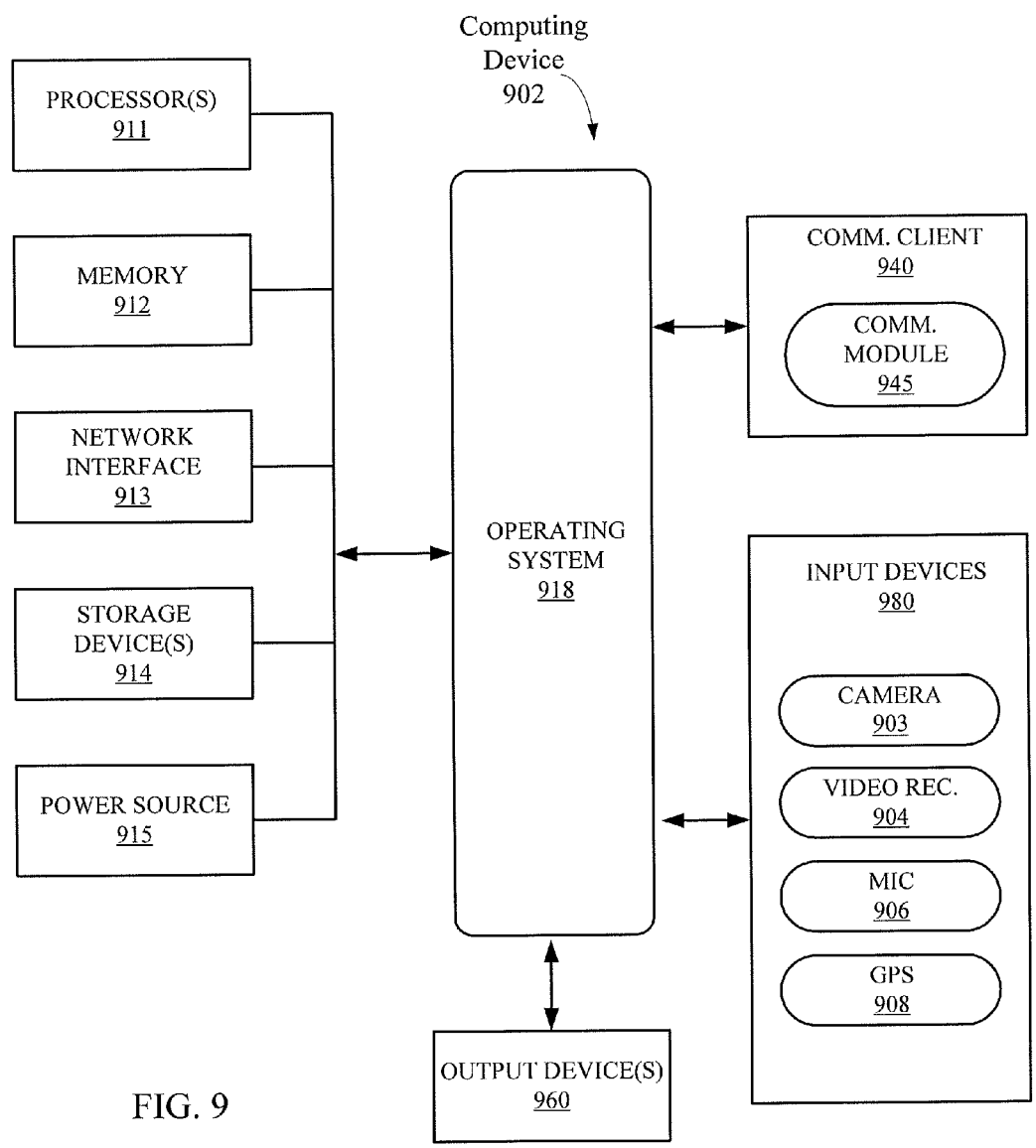
FIG. 9 is a block diagram of example functional components for a computing device configured to perform one or more of the technique described herein, according to one embodiment.

FIG. 9 is a block diagram of example functional components for a computing system or device 902 configured to perform one or more of the techniques described herein, according to one embodiment. For example, the computing device 902 may be configured to determine the initial display settings for a display device and/or to analyze an input data stream and apply a bilateral filter to the input data stream. One particular example of computing device 902 is illustrated. Many other embodiments of the computing device 902 may be used. In the illustrated embodiment of FIG. 9, the computing device 902 includes one or more processor(s) 911, memory 912, a network interface 913, one or more storage devices 914, a power source 915, output device(s) 960, and input device(s) 980. The computing device 902 also includes an operating system 918 and a communications client 940 that are executable by the computing device 902. Each of components 911, 912, 913, 914, 915, 960, 980, 918, and 940 is interconnected physically, communicatively, and/or operatively for inter-component communications in any operative manner.

As illustrated, processor(s) 911 are configured to implement functionality and/or process instructions for execution within computing device 902. For example, processor(s) 911 execute instructions stored in memory 912 or instructions stored on storage devices 914. The processor may be implemented as an ASIC including an integrated instruction set. Memory 912, which may be a non-transient computer-readable storage medium, is configured to store information within computing device 902 during operation. In some embodiments, memory 912 includes a temporary memory, area for information not to be maintained when the computing device 902 is turned OFF. Examples of such temporary memory include volatile memories such as random access memories (RAM), dynamic random access memories (DRAM), and static random access memories (SRAM). Memory 912 maintains program instructions for execution by the processor(s) 911. Example programs can include the image characterization engine 104 and/or the image enhancement engine 106 in FIG. 1.

Storage devices 914 also include one or more non-transient computer-readable storage media. Storage devices 914 are generally configured to store larger amounts of information than memory 912. Storage devices 914 may further be configured for long-term storage of information. In some examples, storage devices 914 include non-volatile storage elements. Non-limiting examples of non-volatile storage elements include magnetic hard disks, optical discs, floppy discs, flash memories, or forms of electrically programmable memories (EPROM) or electrically erasable and programmable (EEPROM) memories.

The computing device 902 uses network interface 913 to communicate with external devices via one or more networks. Network interface 913 may be a network interface card, such as an Ethernet card, an optical transceiver, a radio frequency transceiver, or any other type of device that can send and receive information. Other non-limiting examples of network interfaces include wireless network interface, Bluetooth®, 9G and WiFi® radios in mobile computing devices, and USB (Universal Serial Bus). In some embodiments, the computing device 902 uses network interface 913 to wirelessly communicate with an external device or other networked computing device.

The computing device 902 includes one or more separate or integrated input devices 980. Some input devices 980 are configured to sense the environment and capture images or other signals. Some input devices 980 are configured to receive input from a user through tactile, audio, video, or other sensing feedback. Non-limiting examples of input devices 980 include a presence-sensitive screen, a mouse, a keyboard, a voice responsive system, camera 902, a video recorder 904, a microphone 906, a GPS module 908, or any other type of device for detecting a command from a user or for sensing the environment. In some examples, a presence-sensitive screen includes a touch-sensitive screen.

One or more output devices 960 are also included in computing device 902. Output devices 960 are configured to provide output to another system or device or to a user using tactile, audio, and/or video stimuli. Output devices 960 may include a display screen (e.g., a separate screen or part of the presence-sensitive screen), a sound card, a video graphics adapter card, or any other type of device for converting a signal into an appropriate form understandable to humans or machines. Additional examples of output device 960 include a speaker, a cathode ray tube (CRT) monitor, a liquid crystal display (LCD), or any other type of device that can generate intelligible output to a user. In some embodiments, a device may act as both an input device and an output device.

The computing device 902 includes one or more power sources 915 to provide power to the computing device 902. Non-limiting examples of power source 915 include single-use power sources, rechargeable power sources, and/or power sources developed from nickel-cadmium, lithium-ion, or other suitable material.

The computing device 902 includes an operating system 918. The operating system 918 controls operations of the components of the computing device 902. For example, the operating system 918 facilitates the interaction of communications client 940 with processors 911, memory 912, network interface 913, storage device(s) 914, input device 180, output device 160, and power source 915.

As also illustrated in FIG. 9, the computing device 902 includes communications client 940. Communications client 940 includes communications module 945. Each of communications client 940 and communications module 945 includes program instructions and/or data that are executable by the computing device 902. For example, in one embodiment, communications module 945 includes instructions causing the communications client 940 executing on the computing device 902 to perform one or more of the operations and actions described in the present disclosure. In some embodiments, communications client 940 and/or communications module 945 form a part of operating system 918 executing on the computing device 902.

According to various embodiments, one or more of the components shown in FIG. 9 may be omitted from the computing device 902.

Figure 10:
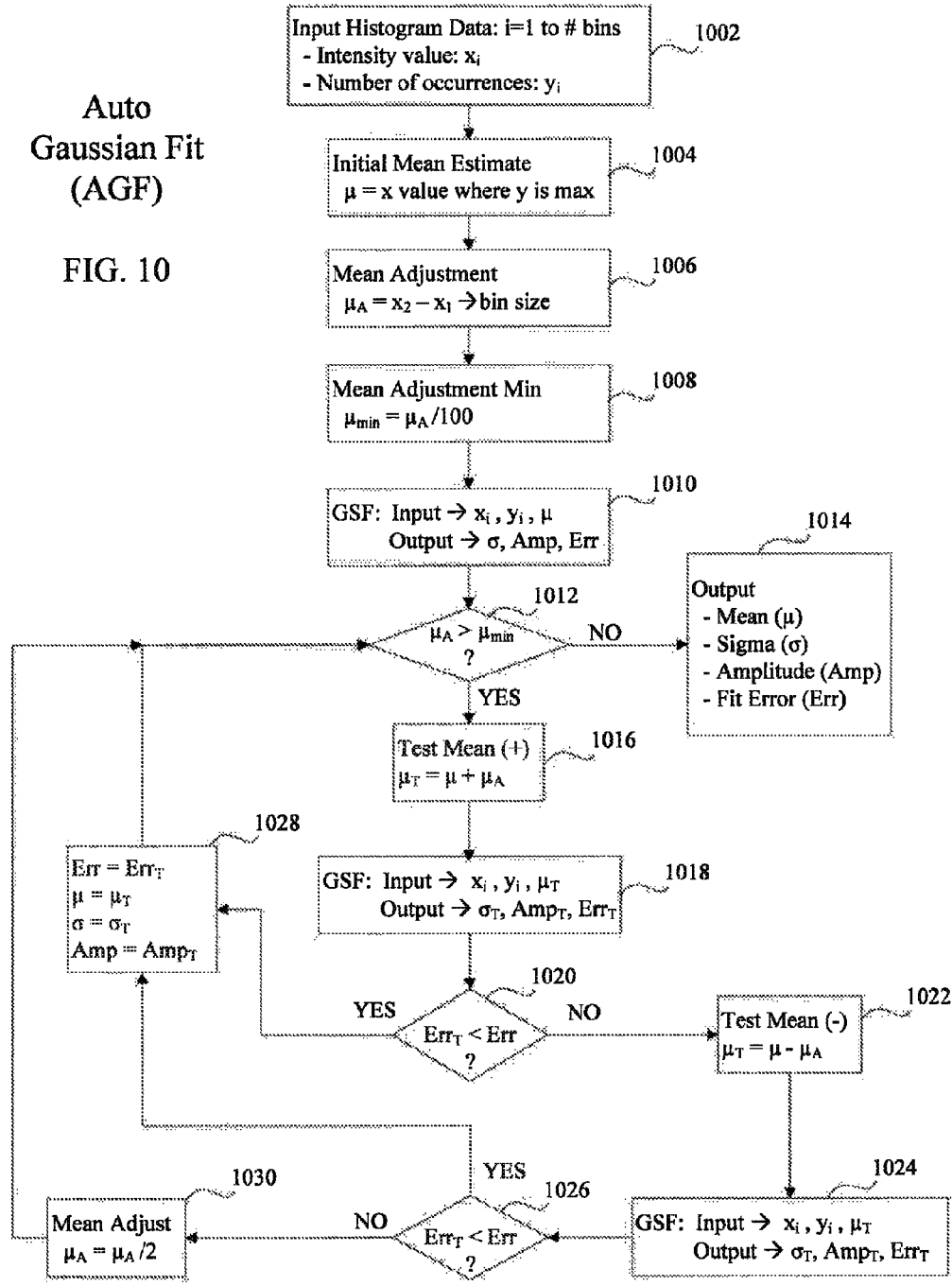
FIG. 10 is a flow diagram of method steps for auto fitting a Gaussian curve to a distribution, according to one embodiment.

FIG. 10 is a flow diagram of method steps for auto fitting a Gaussian curve to a distribution, according to one embodiment. At step 1002, histogram data is input. At step 1004, an initial mean is estimated. At step 1006, a mean adjustment is calculated. At step 1008, a mean adjustment minimum (min) is computed. At step 1010, a Gaussian Sigma Fit (GSF) operation is performed. One example technique for performing a GSF operation is described in FIG. 11, described in more detail below. At step 1012, it is determined whether the mean adjustment is greater than the mean adjustment min. If not, then at step 1014, the mean, sigma (standard deviation), amplitude, and fit error are output. In one embodiment, the mean and sigma output at step 1014 may be used to calculate the display range of a display device, as described above in FIG. 1B. If yes, then at step 1016, a positive test mean is calculated. At step 1018, the GSF operation is performed with the positive test mean. At step 1020, it is determined whether a test error is less than a least squares error. If yes, then at step 1028, the mean, sigma, amplitude, and fit error are each set to a test mean, test sigma, test amplitude, and test fit error, respectively. The method then returns to step 1012. If, at step 1020, the test error is not less than a least squares error, then at step 1022, a negative test mean is calculated. At step 1024, the GSF operation is performed with the negative test mean. At step 1026, it is determined whether a test error is less than a least squares error. If yes, then the method proceeds to step 1028 described above. If, at step 1026, the test error is not less than the least squares error, then at step 1030, the mean adjustment is adjusted to half the mean adjustment and the method proceeds to step 1012 described above.

Figure 11:
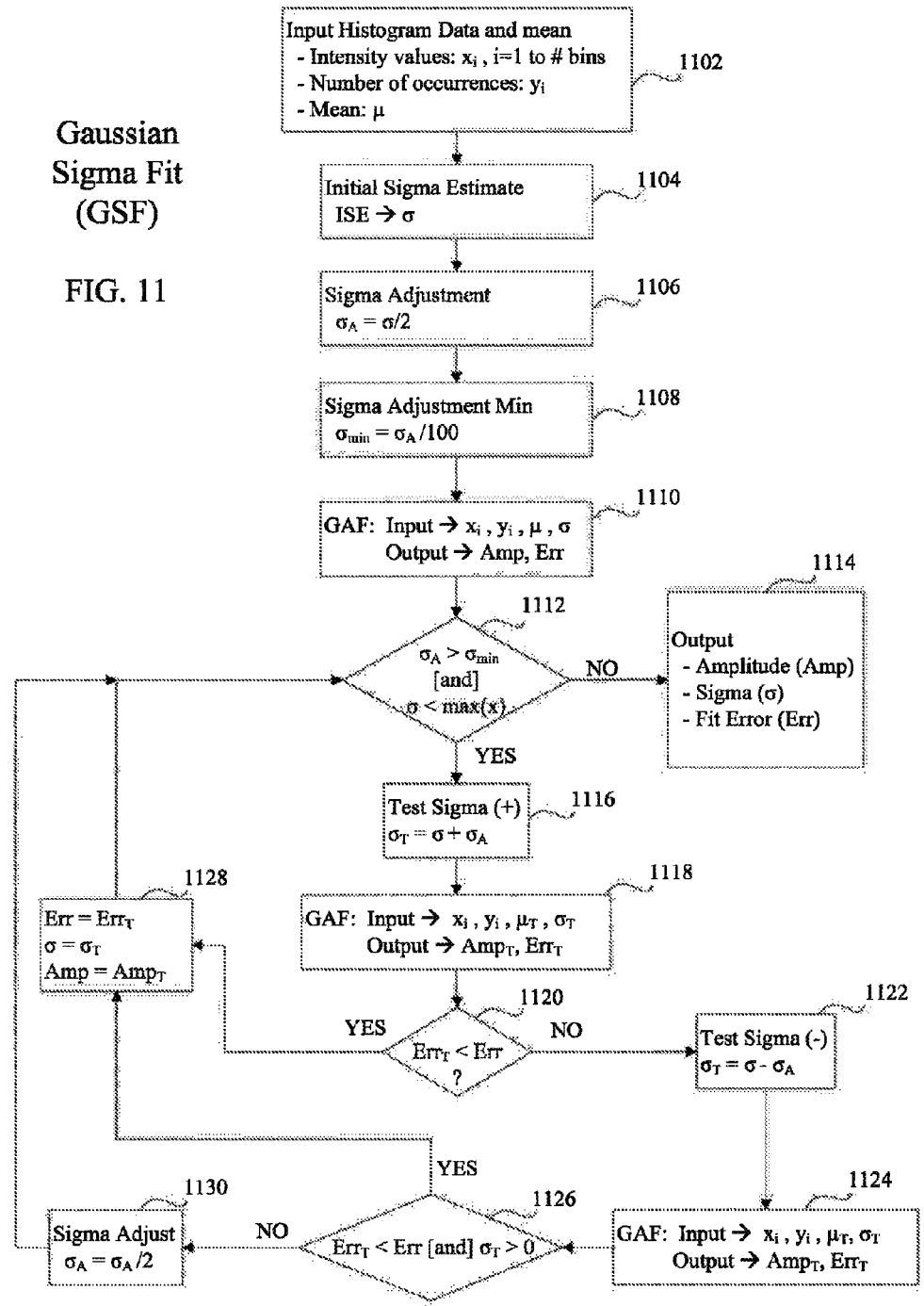
FIG. 11 is a flow diagram of method steps for performing a Gaussian Sigma Fit (GSF) operation, according to one embodiment.

FIG. 11 is a flow diagram of method steps for performing a Gaussian Sigma Fit (GSF) operation, according to one embodiment. At step 1102, histogram data is input. At step 1104, an Initial Sigma Estimate (ISE) operation is performed. One example technique for performing ISE is described below. At step 1106, a sigma adjustment is set equal to half the initial sigma estimate. At step 1108, a sigma adjustment minimum (min) is computed. At step 1110, a Gaussian Amplitude Fit (GAF) operation is performed. One example technique for performing GAF is described below. At step 1112, it is determined whether the sigma adjustment is greater than the sigma adjustment min, and whether the sigma is less than a maximum (max) intensity value. If not, then at step 1114, sigma (standard deviation), amplitude, and fit error are output. If yes, then at step 1116, a positive test sigma is calculated. At step 1118, the GAF operation is performed with the positive test sigma. At step 1120, it is determined whether a test error is less than a least squares error. If yes, then at step 1128, sigma, amplitude, and fit error are each set to a test mean, test sigma, test amplitude, and test fit error, respectively. The method then returns to step 1112. If, at step 1120, the test error is not less than the least squares error, then at step 1122, a negative test sigma is calculated. At step 1124, the GAF operation is performed with the negative test sigma. At step 1126, it is determined whether a test error is less than the least squares error, and whether the test sigma is greater than zero. If yes, then the method proceeds to step 1128 described above. If, at step 1126, the query fails, then at step 1130, the sigma adjustment is adjusted to half the sigma adjustment and the method proceeds to step 1112 described above.

In one embodiment, performing the Initial Sigma Estimate (ISE) operation includes: (a) locating a histogram bin having the greatest count, (b) identifying a second bin as the closest bin to the left or right of the bin having the greatest count that has a count that is less than a percentage (e.g. 60%) of the greatest count, and (c) setting the initial sigma estimate equal to the positive difference between the two identified bin locations (i.e., intensities).

In one embodiment, performing the Gaussian Amplitude Fit (GAF) operation includes the following inputs:

$x_i$=intensity values (histogram x-axis, i=1 to # bins)
$y_i$=number of occurrences (histogram, y-axis)
$\mu$=mean value
$\sigma$=standard deviation The outputs of the GAF operation include:
amp=Gaussian amplitude
$g_i$=Gaussian equation data
$gFit_i$=Gaussian fit data
err=least squares error In one embodiment, the following Equations 1-4 can be used to perform the GAF operation:

$$g_i = e^{-\frac{1}{2}\left(\frac{x_i - \mu}{\sigma}\right)^2}. \quad \text{(Equation 1)}$$

$$amp = \frac{\sum_{i=1}^{\#bins}(y_i \cdot g_i)}{\sum_{i=1}^{\#bins}((g_i)^2)}. \quad \text{(Equation 2)}$$

$$gFit_i = g_i \cdot amp. \quad \text{(Equation 3)}$$

$$err = \sum_{i=1}^{\#bins}((y_i - gFit_i)^2). \quad \text{(Equation 4)}$$

The filtering techniques of the present disclosure also advantageously provide improved file compression, e.g., significantly reduced file size upon signal filtering. The filtering techniques allow for the compression algorithm used to run more efficiently. Specific examples, depending on file type are presented in Table 1, below, which compares examples of unfiltered images being saved by a jpeg algorithm versus saving a filtered image using a jpeg algorithm:

TABLE 1

| File type | Unfiltered compressed file size | Filtered compressed file size |
| --- | --- | --- |
| Digital Video | 15,865 KB | 2,257 KB |
| Second digital video-low light | 36,776 KB | 18,436 KB |
| Low light image | 155 KB | 78 KB |
| Pollen count close up | 293 KB | 109 KB |
| Zoomed in low light image | 463 KB | 326 KB |
| Chemiluminescence image | 158 KB | 43 KB |

For example, in some embodiments, an image or image(s) are processed according to the above methodologies and a compressed image (e.g., compressed filtered image data) is stored to a memory for later use.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the disclosed subject matter (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the disclosed subject matter and does not pose a limitation on the scope of the invention unless otherwise claimed. No language in the specification should be construed as indicating any non-claimed element as essential to the practice of the invention.

Variations of the embodiments disclosed herein may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A processor-implemented method for setting display settings of a display device, the method comprising:
   a) receiving, by a processor, a data stream with data representing an image to be displayed;
   and thereafter
   b) determining, by the processor, a mean ($\mu$) of a system background component of the data stream;
   c) determining, by the processor, a standard deviation ($\sigma$) of a system background component of the data stream;
   d) identifying, by the processor, a multiplier value (M);
   e) calculating, by the processor, a display range of the image to be displayed based on the mean, the standard deviation, and the multiplier value;
   f) setting the display settings of the display device based on the display range; and
   g) displaying the data stream on the display device according to the display settings.

2. The method according to claim 1, wherein the multiplier value is preconfigured.

3. The method according to claim 1, wherein the multiplier value is 100.

4. The method according to claim 1, wherein the multiplier value is adjustable.

5. The method according to claim 1, wherein calculating a display range comprises calculating: $\mu+(M*\sigma)$.

6. The method according to claim 1, further including filtering the data stream by:
   selecting a first region of the image to be displayed;
   generating an initial histogram of pixel intensity values in the first region, wherein the histogram includes a plurality of bins;
   identifying a first bin as a bin having a greatest count of pixel intensity values;

identifying a left bin as a closest bin to the left of the first bin in the histogram that has a count that is less than a first count percentage of the greatest count;

identifying a right bin as a closest bin to the right of the first bin in the histogram that has a count that is less than a second count percentage of the greatest count;

generating an updated histogram of pixel intensity values having a range between the identified left bin and identified right bin;

fitting a Gaussian curve onto the updated histogram; and applying a filter to the image based on parameters of the Gaussian curve.

7. A method according to claim 6, wherein the first count percentage and the second count percentage are 2%.

8. A method according to claim 6, wherein the filter is a bilateral filter.

9. A method according to claim 6, wherein edges of the updated histogram are within a threshold percentage of the range of the pixel intensity values between the identified left bin and identified right bin.

10. A method according to claim 9, wherein the threshold percentage is 80%.

11. The method of claim 1, wherein the data stream comprises data representing multiple images and wherein steps b)-f) are performed for each of the multiple images in the data stream.

12. The method of claim 1, wherein the data stream comprises data representing multiple images and wherein steps b)-f) are performed only once for all of the multiple images in the data stream.

13. The method according to claim 1, further including filtering the data stream by:

selecting a first region of the image to be displayed;

generating an initial histogram of pixel intensity values in the first region, wherein the histogram includes a plurality of bins; and a) identifying a first bin as a bin having a greatest count of pixel intensity values;

b) identifying a left bin as a closest bin to the left of the first bin in the histogram that has a count that is less than a first count percentage of the greatest count;

c) identifying a right bin as a closest bin to the right of the first bin in the histogram that has a count that is less than a second count percentage of the greatest count; and d) determining whether edges of the histogram are within a threshold percentage of the range of pixel intensity values between the identified left bin and identified right bin, and i) if edges of the histogram are within a threshold percentage of the range of pixel intensity values between the identified left bin and identified right bin, fitting a Gaussian curve onto the histogram, and applying a filter to the image based on parameters of the Gaussian curve; and ii) if edges of the histogram are not within a threshold percentage of the range of pixel intensity values between the identified left bin and identified right bin, generating an updated histogram of pixel intensity values having a range between the identified left bin and identified right bin, and repeating steps a)-d) using the updated histogram.

14. A method according to claim 13, wherein the threshold percentage is 80%.

15. A display device comprising one or more processors and a memory storing code, which when executed by the one or more processors cause the one or more processors to implement a method of setting display settings of the display device, the code including instructions to:

receive a data stream with data representing an image to be displayed;

and thereafter determine a mean ($\mu$) of a system background component of the data stream;

determine a standard deviation ($\sigma$) of a system background component of the data stream;

identify a multiplier value (M);

calculate a display range of the image to be displayed based on the mean, the standard deviation, and the multiplier value; and set the display settings of the display device based on the display range.

16. The display device of claim 15, wherein the code further includes instructions to filter the data stream, wherein the instructions to filter the data stream include instructions to:

select a first region of the image to be displayed;

generate an initial histogram of pixel intensity values in the first region, wherein the histogram includes a plurality of bins;

identify a first bin as a bin having a greatest count of pixel intensity values;

identify a left bin as a closest bin to the left of the first bin in the histogram that has a count that is less than a first count percentage of the greatest count;

identify a right bin as a closest bin to the right of the first bin in the histogram that has a count that is less than a second count percentage of the greatest count;

generate an updated histogram of pixel intensity values having a range between the identified left bin and identified right bin;

fit a Gaussian curve onto the updated histogram; and apply a filter to the image based on parameters of the Gaussian curve.

17. The display device of claim 15, wherein the code further includes instructions to filter the data stream, wherein the instructions to filter the data stream include instructions to:

select a first region of the image to be displayed;

generate an initial histogram of pixel intensity values in the first region, wherein the histogram includes a plurality of bins; and a) identify a first bin as a bin having a greatest count of pixel intensity values;

b) identify a left bin as a closest bin to the left of the first bin in the histogram that has a count that is less than a first count percentage of the greatest count;

c) identify a right bin as a closest bin to the right of the first bin in the histogram that has a count that is less than a second count percentage of the greatest count; and d) determine whether edges of the histogram are within a threshold percentage of the range of pixel intensity values between the identified left bin and identified right bin, and i) if edges of the histogram are within a threshold percentage of the range of pixel intensity values between the identified left bin and identified right bin, fit a Gaussian curve onto the histogram, and apply a filter to the image based on parameters of the Gaussian curve; and ii) if edges of the histogram are not within a threshold percentage of the range of pixel intensity values between the identified left bin and identified right bin, generate an updated histogram of pixel intensity values having a range between the identified left bin and identified right bin, and repeating steps a)-d) using the updated histogram.

18. A display device according to claim 17, wherein the threshold percentage is 80%.

19. An image display system, comprising:
a display device, and a processor coupled with the display device, wherein the processor is configured to set or adjust initial display settings of the display device by:
receiving a data stream with data representing an image to be displayed;
and thereafter
determining a mean ($\mu$) of a system background component of the data stream;
determining a standard deviation ($\sigma$) of a system background component of the data stream;
identifying a multiplier value (M);
calculating a display range of the image to be displayed based on the mean, the standard deviation, and the multiplier value; and
setting one or more display settings of the display device based on the display range.

20. The system of claim 19, further including a memory storing instructions, which when executed by the processor cause the processor to set or adjust the initial display settings.

21. The system of claim 19, wherein the processor is further configured to, prior to the determining the mean ($\mu$) of a system background component of the data stream, filter the data stream.

* * * * *